United States Patent
Staab et al.

(10) Patent No.: US 9,682,473 B2
(45) Date of Patent: Jun. 20, 2017

(54) ELECTRIC FLUIDIC ROTARY JOINT ACTUATOR WITH PUMP

(71) Applicant: ABB Technology AG, Zurich (CH)

(72) Inventors: Harald Josef Staab, Laufach (DE); Jeremy Newkirk, West Hartford, CT (US); Thomas Fuhlbrigge, Ellington, CT (US)

(73) Assignee: ABB Schweiz AG, Baden (CH)

( * ) Notice: Subject to any disclaimer, the term of this patent is extended or adjusted under 35 U.S.C. 154(b) by 343 days.

(21) Appl. No.: 14/473,431

(22) Filed: Aug. 29, 2014

(65) Prior Publication Data

US 2016/0059410 A1 Mar. 3, 2016

(51) Int. Cl.
*B25J 9/14* (2006.01)

(52) U.S. Cl.
CPC .............. *B25J 9/146* (2013.01); *B25J 9/142* (2013.01); *Y10S 901/22* (2013.01)

(58) Field of Classification Search
CPC ........... B25J 9/142; B25J 9/146; Y10S 901/22
USPC ............................................ 92/92; 700/253
See application file for complete search history.

(56) References Cited

U.S. PATENT DOCUMENTS

| | | | | |
|---|---|---|---|---|
| 4,645,084 A * | 2/1987 | Deike | ...................... | B25J 9/046 173/194 |
| 6,168,634 B1 * | 1/2001 | Schmitz | ................. | B25J 9/1075 414/4 |
| 6,532,400 B1 * | 3/2003 | Jacobs | .................. | B25J 9/1075 318/568.11 |
| 8,303,670 B2 | 11/2012 | Martin et al. | | |
| 8,360,997 B2 * | 1/2013 | Ferrara | .................... | A61H 1/02 601/5 |
| 8,397,624 B2 * | 3/2013 | Asai | ...................... | F15B 11/186 91/499 |
| 8,650,868 B2 * | 2/2014 | Komatsu | ................ | B25J 9/1615 60/327 |

(Continued)

FOREIGN PATENT DOCUMENTS

CN 102588382 A 7/2012
DE 102 57 414 A1 6/2004

(Continued)

OTHER PUBLICATIONS

Parker Hannifin Corp., "Compact EHA, Electro-Hydraulic Actuators for High Power Density Applications" *Parker Hannifin—Oildyne Division*, (Mar. 2011), pp. 1-8.

(Continued)

*Primary Examiner* — Thomas E Lazo
(74) *Attorney, Agent, or Firm* — Taft, Stettinius & Hollister

(57) ABSTRACT

There is set forth herein an articulated arm, the articulated arm comprising a first rigid link assembly and a second rigid link assembly. The articulated arm can be configured so that the second rigid link assembly rotates in relation to the first link assembly about a rotary axis. The articulated arm can include an actuator for causing rotary movement of the second rigid link assembly in relation to the first rigid link assembly about the rotary axis. The actuator can include a first fluid chamber, and a second fluid chamber. The articulated arm can include a fluid supply assembly for moving fluid into and out of the first fluid chamber and the second fluid chamber.

15 Claims, 15 Drawing Sheets

(56) References Cited

U.S. PATENT DOCUMENTS

| | | | |
|---|---|---|---|
| 2007/0144299 A1* | 6/2007 | Okazaki | B25J 9/1075 |
| | | | 74/490.1 |
| 2012/0055149 A1 | 3/2012 | Vonderwell | |
| 2012/0067035 A1 | 3/2012 | Sweeney et al. | |
| 2012/0291873 A1 | 11/2012 | Potter et al. | |
| 2013/0011567 A1* | 1/2013 | Takebe | B05B 5/1625 |
| | | | 427/401 |

FOREIGN PATENT DOCUMENTS

| | | |
|---|---|---|
| DE | 20 2007 013 300 U1 | 3/2009 |
| EP | 0 314 014 A1 | 3/1989 |
| EP | 0 580 319 A1 | 1/1994 |
| EP | 2 149 434 A1 | 3/2010 |
| JP | 2005/127344 A | 5/2005 |
| WO | WO 01/90490 A1 | 11/2001 |
| WO | WO 2008/143073 A1 | 11/2008 |
| WO | WO 2010/011848 A1 | 1/2010 |
| WO | WO 2012/124853 A1 | 9/2012 |
| WO | WO 2013/054954 A1 | 4/2013 |

OTHER PUBLICATIONS

Micromatic, LLC., "Hydraulic Rotary Actuators", *Micromatic LLC.*, (May 2007 / REV. Jun. 2007), pp. 1-7, E-1-E-19, MP-1-MP-4, SS-1-SS-4, HS-1-HS-4, R-1-R-4, and OA-1-OA-6, vol. 9.

Kleegrewe, Thomas, Schulze, Stephan and Horst, Bender, "ABB Actuator & Positioners—Valve and damper controls in power plants", *ABB Instrumentation*, (2010), pp. 1-4.

Wikipedia, "Electro-hydrostatic actuator", *wikipedia.org*, Apr. 30, 2014.

Frischemeier, Stefan, "Electrohydrostatic Actuators for Aircraft Primary Flight Control—Types, Modelling and Evalutation", *5th Scandinavian International Conference on Fluid Power*, (May 28-Jan. 30, 1997 ) pp. 1-16.

Navarro, Robert, "Performance of an Electro-Hydrostatic Actuator on the F-18 Systems Research Aircraft", *NASA/TM-97-206224 Dryden Flight Research Center*, (Oct. 1997), pp. 1-32.

Micromatic, LLC, "Actuators for Garbage and Trash Trucks", *micromaticllc.com*, (May 8, 2014).

U.S. Appl. No. 14/473,396, filed Aug. 29, 2014.

* cited by examiner

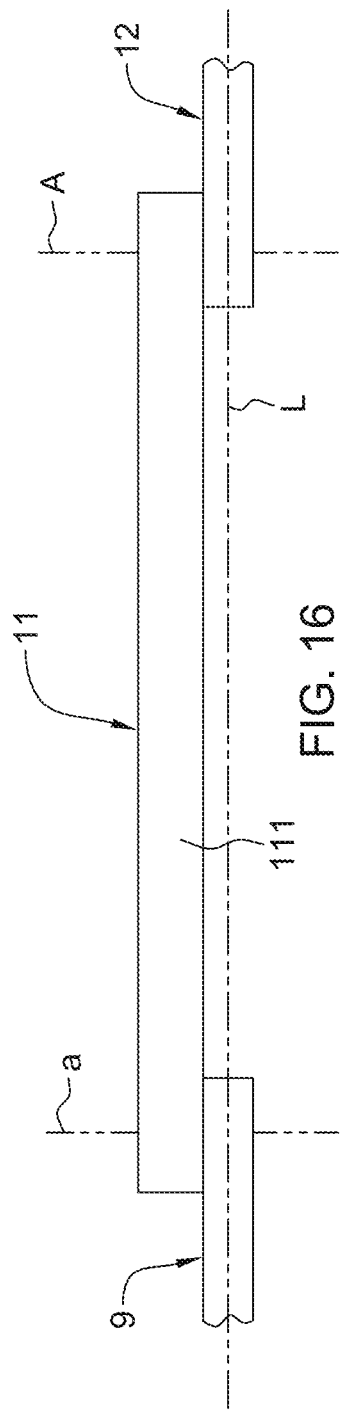

ELECTRIC FLUIDIC ROTARY JOINT
ACTUATOR WITH PUMP

FIELD

There is set forth herein an articulated arm, and more particularly an articulated arm having a first and second rigid link assemblies rotatably connected so that the second rigid link assembly rotates in relation to the first rigid link assembly about an axis.

BACKGROUND

According to a commercially available design for an articulated robot arm, a robot arm can include a first rigid link assembly and a second rigid link assembly. The first rigid link assembly and the second rigid link assembly can be connected so that the second rigid link assembly moves in relation to the first rigid link assembly about an axis. In a commercially available design, a motorized gearbox can be provided for providing the required motion of the second rigid link assembly in relation to the first rigid link assembly about the axis. Motorized robot gearboxes for providing required motion of rigid link assembly about an axis often must be manufactured within strict tolerances to satisfy requirements of precision and stiffness.

Gearboxes for articulated robot arms are often the most expensive component of a robot arm. Gearboxes are susceptible to failure by way of a variety of wear processes including abrasive wear, corrosive wear, and pitting. Gear tooth overload can occur when a gear is no longer capable of supporting an intended load.

BRIEF DESCRIPTION

There is set forth herein an articulated arm, the articulated arm comprising a first rigid link assembly and a second rigid link assembly. The articulated arm can be configured so that the second rigid link assembly rotates in relation to the first link assembly about a rotary axis. The articulated arm can include an actuator for causing rotary movement of the second rigid link assembly in relation to the first rigid link assembly about the rotary axis. The actuator can include a first fluid chamber, and a second fluid chamber. The articulated arm can include a fluid supply assembly for moving fluid into and out of the first fluid chamber and the second fluid chamber. One or more component of the fluid supply assembly can be supported in a fixed position in relation to respective fluid supply ends the first fluid chamber and the second fluid chamber.

BRIEF DESCRIPTION OF THE SEVERAL VIEWS OF THE DRAWINGS

In the views, wherein like element numbers are used to indicate like elements throughout the views;

FIG. 16 is a front view of an articulated robot arm in one embodiment having a first rigid link assembly connected to a proximal rigid link assembly and a second rigid link assembly;

DETAILED DESCRIPTION

Figure 1:
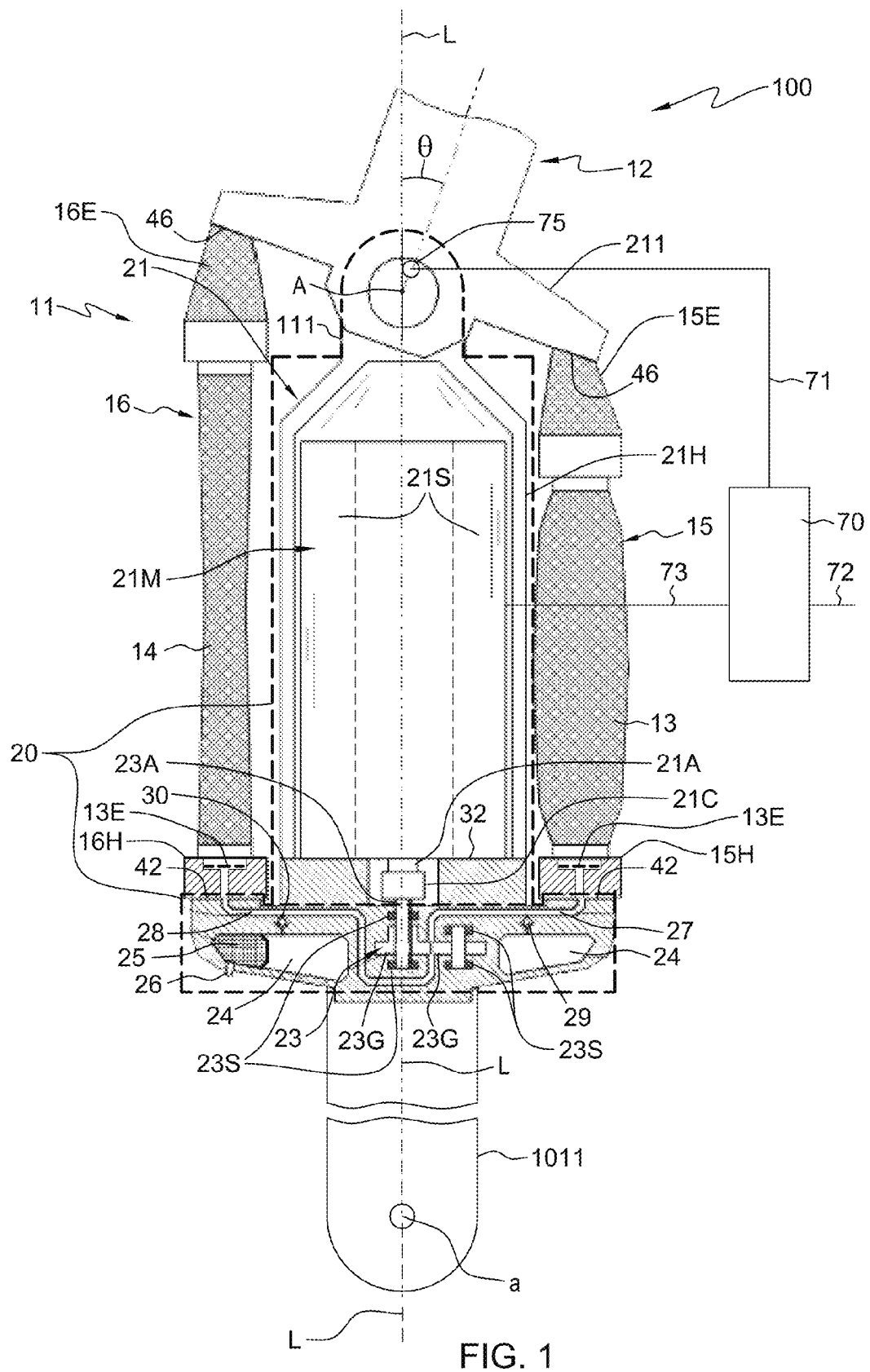
FIG. 1 is a combination side and cross sectional view of an articulated robot arm in one embodiment.

There is shown in FIG. 1 according to one embodiment an articulated arm 100. The articulated arm 100 can include a first rigid link assembly 11 and a second rigid link assembly 12. The articulated arm 100 can include a hydraulic actuator having first fluid chamber 13 second fluid chamber 14 and fluid supply assembly 20. When actuated the actuator having first fluid chamber 13, second fluid chamber 14 and fluid supply assembly 20 can cause second rigid link assembly 12 to rotate in relation to first rigid link assembly 11 about rotary axis A to define a rotary joint. In one embodiment, the fluid supplied by fluid supply assembly 20 can be essentially incompressible. In one embodiment, the fluid supplied by fluid supply assembly 20 can be compressible.

Fluid supply assembly 20 can include a motor driven pump 23, a reservoir 24, fluid supply lines 27 and 28 between the reservoir 24 and the first and second fluid chambers 13 and 14, check valves 29 and 30 between the fluid supply lines 27 and 28 and the reservoir 24, and a motor assembly 21 for driving the pump 23. Reservoir 24 and fluid supply lines 27 and 28 can be defined by rigid structural member 32 of unitary construction in the embodiment of FIG. 1 and check valves 29 and 30 can be supported by rigid structural member 32. A change in a volume of fluid in one or more of chamber 13 or chamber 14 can result in a change of the current value of angle θ, between rigid link assembly 12 and rigid link assembly 11. The angle, θ, can be regarded to be a joint angle. In one embodiment, a relative volume of fluid in the first fluid chamber 13 and the second fluid chamber 14 can determine a current value of the angle, θ, that specifies a rotary position angle of second rigid link assembly 12 in relation to first rigid link assembly 11. In the embodiment of FIG. 1 first fluid chamber 13 and second fluid chamber 14 can be non-coaxial relative to each other and can be disposed laterally relative to each other.

Referring to further aspects of the embodiment of FIG. 1, the hydraulic actuator in the embodiment of FIG. 1 is in the configuration of a muscle actuator. For configuration of a muscle actuator, first rigid link assembly 11 can support flange surfaces 42 and second rigid link assembly 12 can support flange surfaces 46 opposing flange surfaces 42. Rigid link assembly 12 can include a rigid link member 211 of unitary construction that defines flange surfaces 46. Flange surfaces 42 can be defined on rigid structural member 32 in the embodiment of FIG. 1.

First and second muscles 15 and 16 can be disposed adjacently to longitudinal axis L of first rigid link assembly 11 and can extend in directions generally parallel to longitudinal axis L. First muscle 15 can be connected to a first set of opposing flange surfaces 42 and 46. Second muscle 16 can be connected to second set of opposing flange surfaces 42 and 46. Hub 15H of first muscle 15 can be rigidly joined to a first flange surface 42 of flange surfaces 42 and resilient extender 15E of muscle can be joined to a first flange surface of flange surfaces 46. Hub 16H of second muscle 16 can be rigidly joined to a second flange surface 42 of flange surfaces 42 and resilient extender 16E of muscle 16 can be joined to a first flange surface of flange surfaces 46. Hub 15H can further define fluid supply line 27 and hub 16H can further define fluid supply line 28. First muscle 15 and second muscle 16 can be elongated. First muscle 15 can include first fluid chamber 13 and second muscle 16 can include second fluid chamber 14. Each muscle 15, 16 can include a flexible bladder defining a muscle's fluid chamber and a fiber shield surrounding the flexible bladder. When pressurized by fluid entering first fluid chamber 13, muscle 15 can contract to move second rigid link assembly 12 clockwise about rotary axis A in relation to first rigid link assembly 11. When pressurized by fluid entering second fluid chamber 14 muscle 16 can contract to move second rigid link assembly 12 counter-clockwise about rotary axis A in relation to first rigid link assembly 11.

Referring to further aspects of fluid supply assembly 20 in the embodiment of FIG. 1, fluid supply assembly 20 can include a pump 23. Pump 23 can be provided by a rotary gear pump and can include gears 23G. Pump 23 can have an axle 23A driven by motor assembly 21. Pump 23 can include a pump stator 23S which can include bearing housings. Pump stator 23S can be supported by rigid structural member 32 in fixed position in relation to rigid structural member 32. Pump 23 can move fluid into and out of first fluid chamber 13 and second fluid chamber 14. Motor assembly 21 can include motor 21M supported and housed by motor housing 21H. Motor assembly 21 can also include a motor axle 21A and a coupling 21C for coupling motor axle 21A to pump axle 23A.

Between pump 23 of fluid supply assembly 20 and first fluid chamber 13 fluid supply assembly 20 can include fluid supply line 27. Between pump 23 and second fluid chamber 14, fluid supply assembly 20 can include fluid supply line 28. Fluid supply line 27 and fluid supply line 28 can be defined by rigid structural member 32 of unitary construction. Fluid supply line 27 can further be defined in hub 15H and fluid supply line 28 can be further defined in hub 16H. Fluid supply line 27 and fluid supply line 28 can be bored into rigid structural member 32 in one embodiment. Rigid structural member 32 of unitary construction defining reservoir 24, fluid supply line 27 and fluid supply line 28 can be regarded as a component of fluid supply assembly 20.

Reservoir 24 of fluid supply assembly 20 can be adapted to provide fluid to pump 23. A flow of fluid between reservoir 24 and pump 23 can depend on an open/closed state of check valve 29 disposed between fluid supply line 27 and reservoir 24 and on an open/closed state of check valve 30 disposed between fluid supply line 28 and reservoir 24. When pump 23 is rotated in a first direction so that fluid supply line 27 and first fluid chamber 13 enter a pressure state and further so that fluid supply line 28 and second fluid chamber 14 enter a suction state, check valve 29 can close and check valve 30 can open. With pump 23 rotated in a first direction and with check valve 29 closed and check valve 30 open, fluid from reservoir 24 can be moved by pump 23 through check valve 30 and through fluid supply line 28 pump 23 and fluid supply line 27 and outward into first fluid chamber 13. With pump 23 rotated in a first direction and with check valve 29 closed and check valve 30 open, fluid can be drawn from second fluid chamber 14 and moved into reservoir 24 through fluid supply line 28 and check valve 30. With pump 23 rotated in a first direction and with check valve 29 closed and check valve 30 open, fluid can be drawn from second fluid chamber 14 and moved into first fluid chamber 13 through fluid supply line 28 pump 23 and fluid supply line 27.

With pump 23 rotated in a second direction opposite the first direction so that fluid supply line 28 and second fluid chamber 14 enter a pressure state and fluid supply line 27 and first fluid chamber 13 enter a suction state, check valve 30 can close and check valve 29 can open. With pump 23 rotated in a second direction and with check valve 30 closed and check valve 29 open, fluid from reservoir 24 can be moved by pump 23 through check valve 29 and through fluid supply line 27 pump 23 and fluid supply line 28 and outward into second fluid chamber 14. With pump 23 rotated in a second direction and with check valve 30 closed and check valve 29 open, fluid can be drawn from first fluid chamber 13 and moved into reservoir 24 through fluid supply line 27 and check valve 29. With pump 23 rotated in a second direction and with check valve 30 closed and check valve 29 open, fluid can be drawn from first fluid chamber 13 and moved into second fluid chamber 14 through fluid supply line 27, pump 23 and fluid supply line 28.

Where fluid supplied by fluid supply assembly 20 is essentially incompressible, there can be included within reservoir 24 compressible bladder 25 which can compress in the event there are volume changes resulting from, e.g. temperature changes. Bladder 25 can optionally include a port 26 defined in rigid structural member 32 that allows measurement and adjustment of fluid pressure within reservoir 24.

Figure 2:
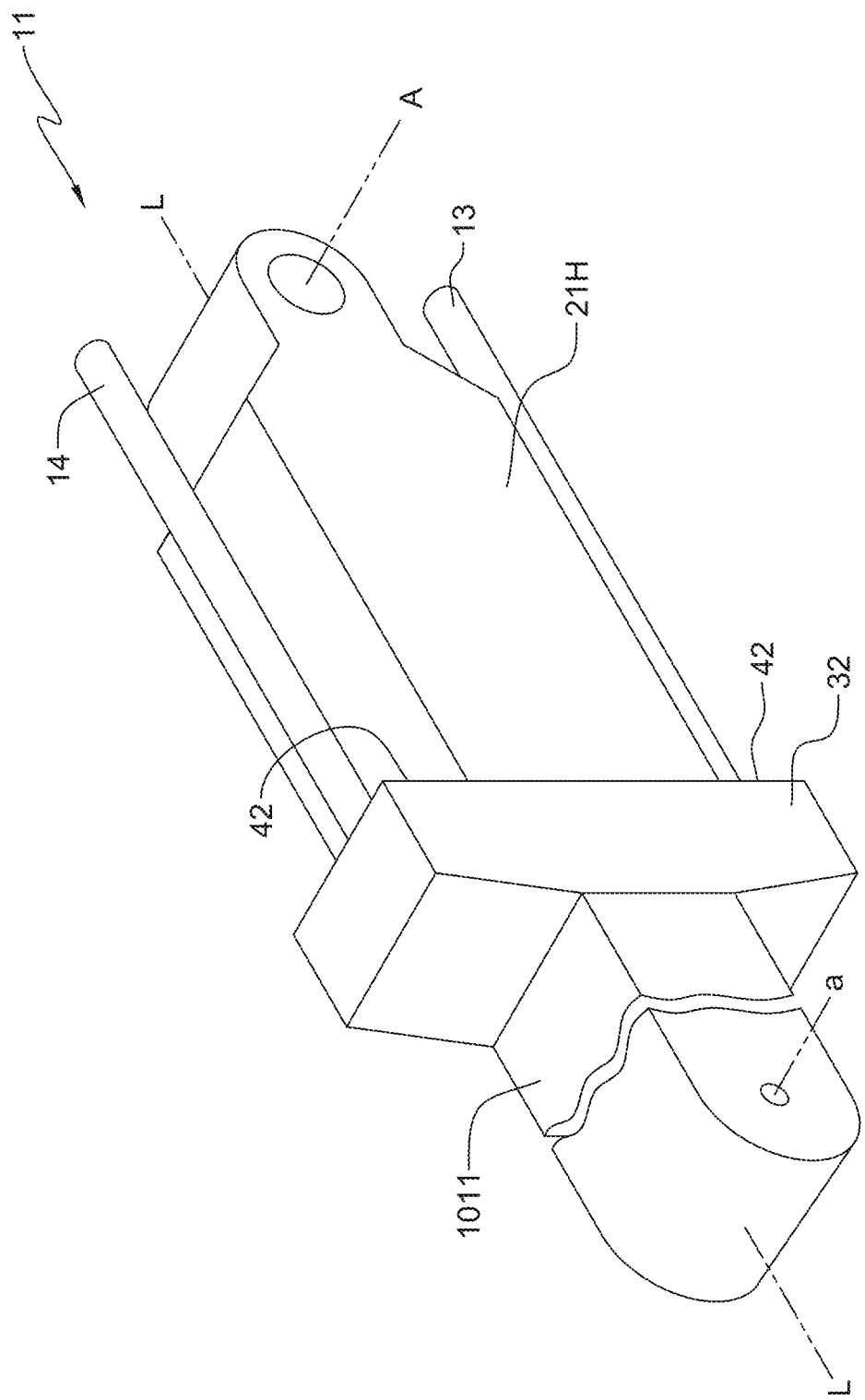
FIG. 2 is a schematic perspective view of a rigid link assembly having functionality of the rigid link assembly set forth in reference to the articulated robot arm set forth in FIG. 1.

In FIG. 2 there is shown a perspective view of a rigid link assembly 11 having functional characteristics of rigid link assembly 11 as set forth in reference to FIG. 1. Rigid link assembly 11 as shown in FIG. 2, can include rigid link member 1011 of unitary construction rigidly joined to rigid structural member 32 of unitary construction which rigid structural member 32 can be rigidly joined to motor housing 2111 of unitary construction which can extend to axis A. Muscle 15 and muscle 16 can be joined to flange surfaces 42 defined on rigid structural member 32.

Figure 3:
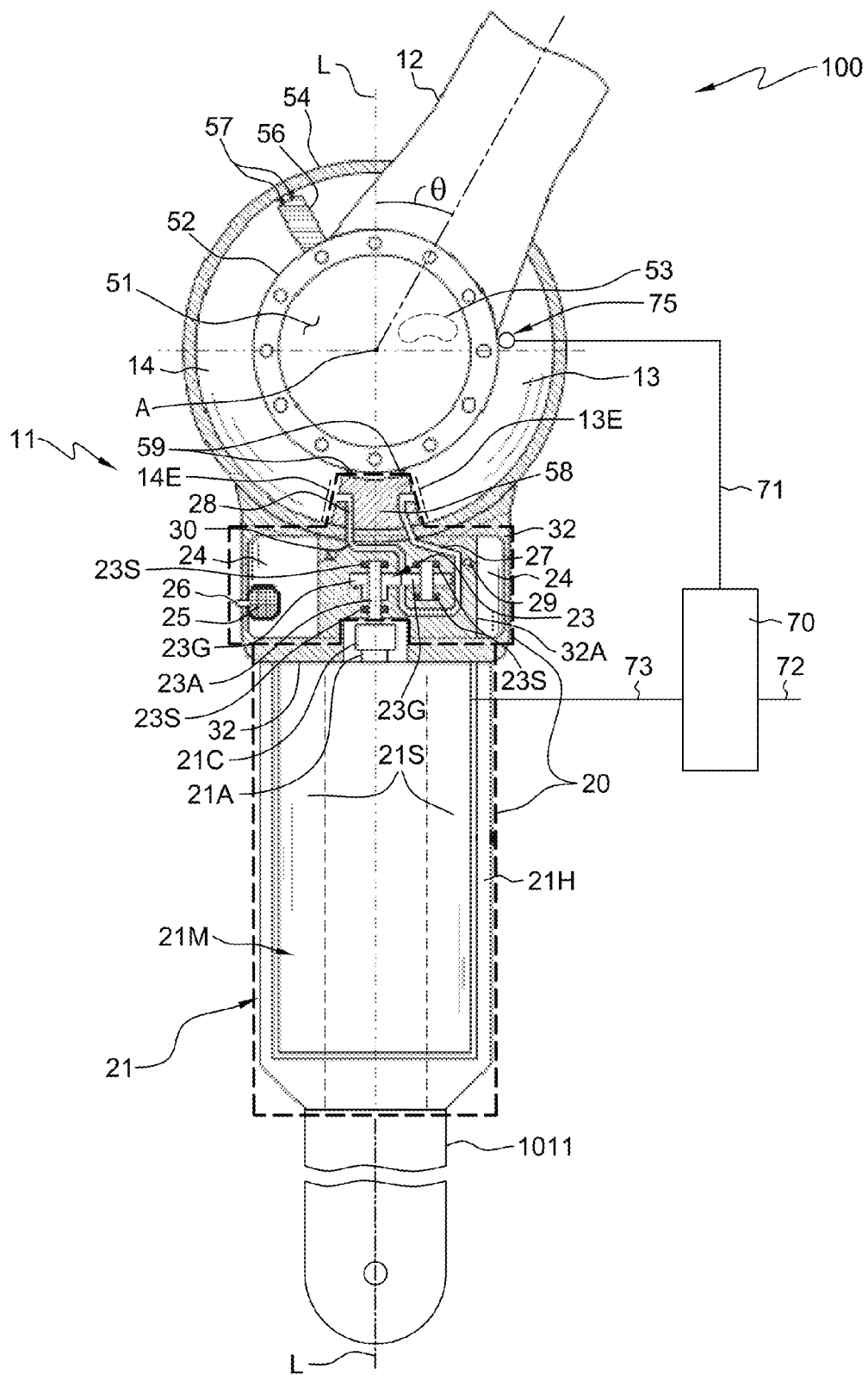
FIG. 3 is a combination side and cross sectional view of an articulated robot arm in one embodiment.

Referring to FIG. 3, another exemplary articulated arm 100 having an alternative type of actuator is shown and described. In the embodiment of FIG. 3, inner cylinder 52 can rotate within outer cylinder 54. Vane 56 can be rigidly joined to an interior surface of inner cylinder 52 and can extend to an interior surface of outer cylinder 54. An interface between vane 56 and outer cylinder 54 can be sealed by seal 57. Second rigid link assembly 12 can include inner cylinder 52 so that second rigid link assembly 12 can rotate with respect to first rigid link assembly 11. First fluid chamber 13 can be defined by the annular volume between a first side of vane 56 and a first side of shoe 58. Second fluid chamber 14 can be defined by the annular volume between a second side of vane 56 and a second side of shoe 58. Shoe 58 can be provided by a block of solid material rigidly joined to an interior surface of outer cylinder 54. A seal 59 can be provided at an interface between shoe 58 and an interior surface of inner cylinder 52. A substantially sized open volume 51 can be defined at an interior of inner cylinder 52. In one aspect of inner cylinder 52, inner cylinder 52 can have an exterior surface that defines an open volume 51 intersected by the rotary axis A, the inner cylinder 52 having an interior surface that defines the first fluid chamber 13 and the second fluid chamber 14. One or more flexible component 53, e.g., one or more flexible electrical cables and/or flexible fluid conduit of articulated arm 100 can be routed through open volume 51, thereby reducing a risk of interference between rigid link assemblies of articulated arm 100 and such one or more flexible component. Open volume 51 can be a cylindrical open volume as depicted in FIG. 3. In one embodiment the diameter of the open volume can be equal to or greater than 1.0 cm; in another embodiment equal to or greater than 2.0 cm; in another embodiment equal to or greater than 3.0 cm; in another embodiment equal to or greater than 4.0 cm; in another embodiment equal to or greater than 5.0 cm. An actuator in accordance with the embodiment of FIG. 3 can be regarded as an annular chamber actuator based the volumetric shape of fluid chamber 13 and fluid chamber 14 in one embodiment.

A change in a volume of fluid in one or more of chamber 13 or chamber 14 can result in a change of the current angle, θ, between rigid link assembly 12 and rigid link assembly 11 about rotary axis A. In one embodiment, a current value for an angle, θ, between second rigid link assembly 12 and first rigid link assembly 11 can be controlled by the relative volume of fluid in first fluid chamber 13 and in second fluid chamber 14. A change in a volume of fluid in one or more of chamber 13 or chamber 14 can result in a change of the current angle θ, between rigid link assembly 12 and rigid link assembly 11.

In the manner of the embodiments described with reference to FIGS. 1 and 2, a fluid supply assembly 20 in the embodiment of FIG. 3 can include the combination of reservoir 24, fluid supply lines 27 and 28, check valves 29 and 30 functioning in the manner of the embodiment of FIG. 1, and of motor assembly 21 including motor 21M motor housing 21H and motor axle 21A functioning in the manner of the embodiment of FIG. 1. Fluid supply assembly 20 can include bladder 25 and port 26 functioning in the manner described with reference to the embodiment of FIG. 1. As shown in the embodiment of FIG. 3, fluid reservoir 24 can be defined by rigid structural member 32 of unitary construction. In the embodiment of FIG. 3, rigid structural member 32A of unitary construction can be rigidly joined to rigid structural member 32 and rigid structural member 32A can define fluid supply lines 27 and 28 and can further define reservoir 24. Fluid supply lines 27 and 28 can be further defined by outer cylinder 54 and by shoe 58 that can be rigidly joined to outer cylinder 54. Check valves 29 and 30 and pump stator 23S can be supported by rigid structural member 32A.

Figure 4:
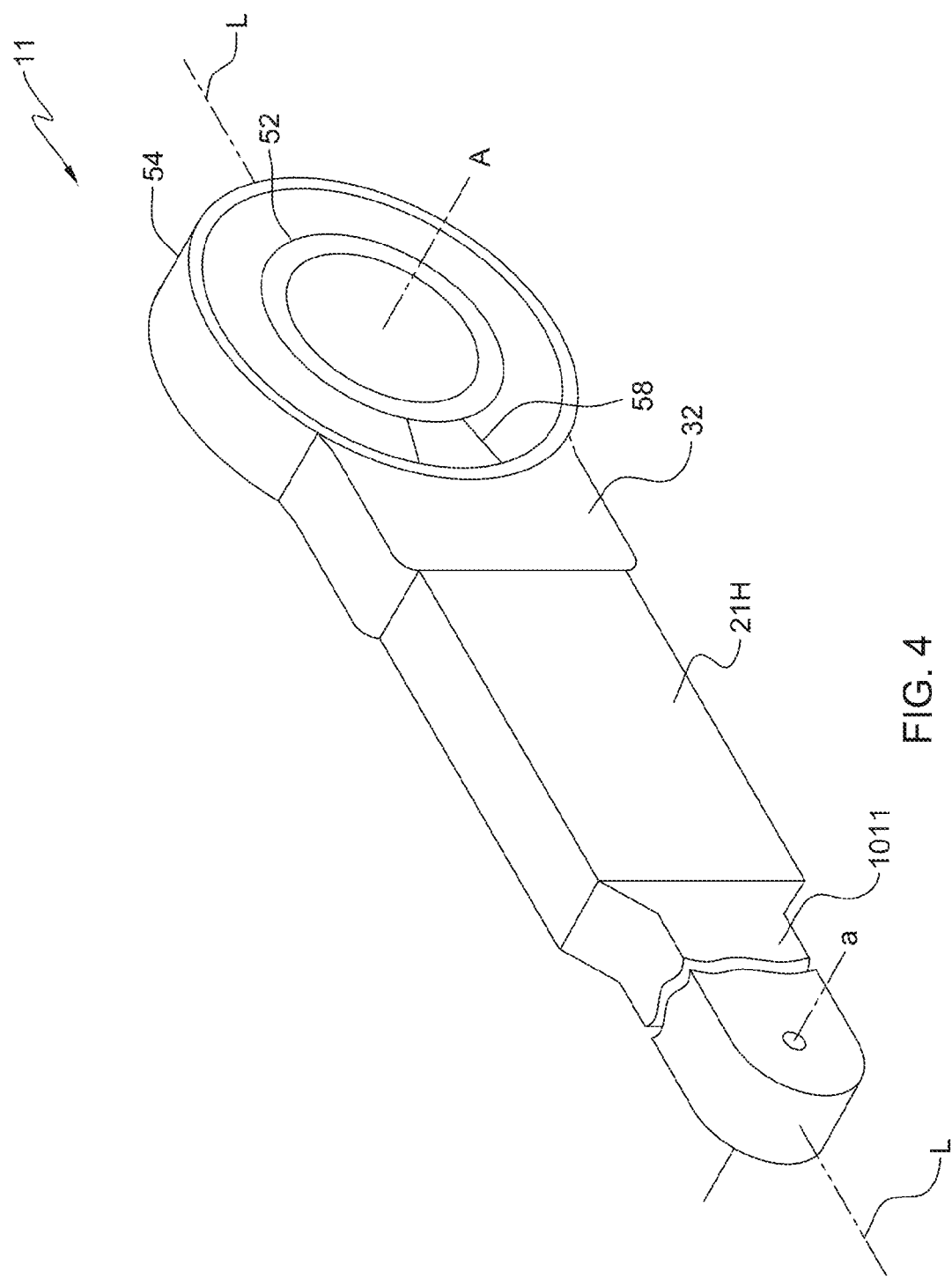
FIG. 4 is a schematic perspective view of a rigid link assembly having functionality of the rigid link assembly set forth in reference to the articulated robot arm set forth in FIG. 3.

In FIG. 4 there is shown a perspective view of a rigid link assembly 11 having functional characteristics of rigid link assembly 11 as set forth in reference to FIG. 3. Rigid link assembly 11 as shown in FIG. 4 can include rigid link member 1011 of unitary construction rigidly joined to rigid structural member 32 of unitary construction which can be rigidly joined to motor housing 21H of unitary construction which can be rigidly joined to outer cylinder 54 of unitary construction which can extend to axis A.

Referring to further aspects of articulated arm 100, one or more component of fluid supply assembly 20 can be supported in a fixed position in relation to a fluid supply end 13E of chamber 13 and to a fluid supply end 14E of chamber 14. The providing of fluid supply assembly 20 so that one or more component of fluid supply assembly 20 is supported in a fixed position in relation to fluid supply end 13E of chamber 13 and to a fluid supply end 14E of chamber 14 provides various advantages. Providing one or more component of fluid supply assembly 20 so that one or more component of fluid supply assembly 20 is supported in a fixed position in relation to fluid supply end 13E of chamber 13 and to a fluid supply end 14E of chamber 14 encourages free unencumbered movement of second rigid link assembly 12 with reduced risk of damage to fluid supply assembly 20. It was determined that where one or more component of fluid supply assembly 20 is not supported in a fixed position in relation fluid supply end 13E of chamber 13 and to a fluid supply end 14E of chamber 14, one or more component of fluid supply assembly 20 can interfere with movement of first rigid link assembly 11 or another component of articulated arm 100. A component supported in a fixed position in relation to fluid supply end 13E of chamber 13 and to a fluid supply end 14E of chamber 14 can be defined in or supported directly by a member defining the fluid supply end 13E, 14E or can be defined in or supported through one or more additional members rigidly joined to a member defining fluid supply end 13E, 14E.

In the embodiment of FIGS. 1 and 2, fluid supply ends 13E and 14E of chamber 13 and chamber 14 can be defined by muscle hubs 15H and 16H respectively and the following components can be among components of fluid supply assembly 20 supported in fixed position in relation to chamber fluid supply ends 13E and 14E. Hubs 15H and 16H, rigid structural member 32, reservoir 24 and fluid supply lines 27 and 28 defined by hubs 15H and 16H and by rigid structural member 32, stationary components of check valves 29 and 30 supported by rigid structural member 32, stationary components of motor assembly 21, including motor housing 21H and a motor stator 21S of motor 21M, and stationary components of pump 23 including pump stator 23S supported by rigid structural member 32. Referring to further aspects of the embodiment of FIGS. 1 and 2, rigid structural member 32 can be rigidly joined to muscle hubs 15H and 16H and motor housing 21H which can support in a fixed position stationary components of motor 21M and stationary components of pump 23 which can be rigidly joined to rigid structural member 32. Because a succession of rigidly joined rigid link members that define a spacing distance between proximal axis a and rotary axis A can rotate about proximal axis a and can support rotation of rigid link assembly 12 about rotary axis A, the components 32, 24, 27, 28, 29, 30, 23S, 21H and 21S of fluid supply assembly 20 as described in connection with the embodiments of FIGS. 1 and 2 can be supported in a fixed position by rigid link member 111 in relation to proximal axis a and rotary axis A.

In the embodiment of FIGS. 3 and 4, fluid supply ends 13E and 14E of chamber 13 and chamber 14 respectively can be defined by shoe 58 and the following components of fluid supply assembly 20 can be supported in fixed position in relation to fluid supply ends 13E and 14E of chamber 13 and 14 respectively: Shoe 58, rigid structural member 32, rigid structural member 32A, fluid supply lines 27 and 28 defined by shoe 58, outer cylinder 54 and rigid structural member 32A, reservoir 24 defined by rigid structural member 32 and rigid structural member 32A, stationary components of check valves 29 and 30 supported by rigid structural member 32A, stationary components of motor assembly 21 including motor housing 21H and motor stator 21S of motor 21M, and stationary components of pump 23 including pump stator 23S supported by rigid structural member 32A in fixed position in relation to rigid structural member 32A. Referring to further aspects of the embodiment of FIGS. 3 and 4, shoe 58 can be rigidly joined to outer cylinder 54. Rigid structural member 32 which can have rigidly joined thereto rigid structural member 32A can be rigidly joined to outer cylinder 54. Motor housing 21H (which can support in a fixed position a motor stator 21S of motor 21M) can be rigidly joined to rigid structural member 32. Because a succession of rigidly joined rigid link members that define a spacing distance between proximal axis a and rotary axis A can rotate about proximal axis a and can support rotation of rigid link assembly 12 about rotary axis A, the components 32, 32A, 24, 27, 28, 29, 30, 23S, 21H and 21S of fluid supply assembly 20 as described in connection with the embodiments of FIGS. 3 and 4 can be supported in a fixed position by rigid link member 111 in relation to proximal axis a and rotary axis A.

In one aspect, one or more of fluid supply line 27 extending between pump 23 and first chamber 13 or fluid supply line 28 extending between pump 23 and second chamber 14 as set forth in the embodiments described in reference to FIGS. 1-8 can be absent of a flexible section. In one aspect, the configuring of fluid supply assembly 20 so that one or more component of fluid supply assembly 20 is supported in a fixed position in relation to fluid supply end 13E and fluid supply end 14E of second fluid chamber 14 can facilitate the providing of one or more of fluid supply line 27 or fluid supply line 28 to be absent a flexible section. Configuring fluid supply assembly 20 so that one or more of reservoir 24 and pump 23 are supported in a fixed position in relation to fluid supply end 13E of chamber 13 and fluid supply end 14E of chamber 14 can facilitate a configuring of fluid supply line 27 and a fluid supply line 28 to be absent a flexible section.

In the example of FIG. 1, reservoir 24 and fluid supply lines 27 and 28 can be defined by a member of unitary construction provided by rigid structural member 32 which can be rigidly joined to members 15H and 16H in which chamber ends 13E and 14E can be defined. Rigid structural member 32 can also support in a fixed position relative thereto pump stator 23S. Stationary components of motor assembly 21 such as motor stator 21S in can be supported in a fixed position in relation to motor housing 21H which can be rigidly joined to rigid structural member 32 so that stationary components of motor assembly 21 can supported in a fixed position in relation to chamber ends 13E and 14E.

In the example of FIG. 3, reservoir 24 can be defined by a member of unitary construction provided by rigid structural member 32 which can be rigidly joined to the member of unitary construction provided by cylinder 54 in which chamber ends 13E and 14E can be defined. Rigid structural member 32 can be rigidly joined to rigid structural member 32A which can define fluid supply lines 27 and 28 and support in a fixed position relative thereto pump stator 23S. Stationary components of motor assembly 21 such as motor stator 21S in can be supported in a fixed position in relation to motor housing 21H which can be rigidly joined to rigid structural member 32 so that stationary components of motor assembly 21 can be supported in a fixed position in relation to chamber ends 13E and 14E.

Providing one or more of fluid supply line 27 or fluid supply line 28 to be absent a flexible section can avoid interference between a fluid supply line 27 or fluid supply line 28 and first rigid link assembly 11 or another component of articulated arm 100. Providing one or more of fluid supply line 27 or fluid supply line 28 to be of reduced length and to be absent a flexible section can reduce a friction of fluid flowing through one of more of fluid supply line 27 or fluid supply line 28. Fluid flowing through fluid supply line 27 and fluid supply line 28 can have an appreciable viscosity, and in one embodiment can be provided by oil. With a friction of fluid flowing through one or more of fluid supply line 27 or fluid supply line 28 reduced, power output and pressure requirements of fluid supply assembly 20 can be reduced. With fluid supply line 27 and fluid supply line 28 shorter, pump 23 can move fluid through fluid supply line 27 and fluid supply line 28 with reduced power output and reduced pressure. A reduced path length for one or more of fluid supply line 27 or fluid supply line 28 can be facilitated by a configuration in accordance with FIG. 1 or FIG. 3 where reservoir 24 can be defined by a rigid structural member 32 of unitary construction that can be rigidly joined to a member that defines a fluid supply end 13E or 14E of a fluid chamber 13 or 14 (member 32 can be rigidly joined to hub 15H and hub 16H in the embodiment of FIG. 1, member 32 and member 54 can be rigidly joined in the embodiment of FIG. 3).

Articulated arm 100 can include various features that facilitate a low cost compact configuration. In some embodiments, a rigid link member of rigid link assembly 11 that defines a spacing distance between proximal axis a and rotary axis A can be provided by one or more component of fluid supply assembly 20. In one example of such embodiments, a component of fluid supply assembly 20 can provide multiple functions of operating in accordance with requirements of fluid supply assembly 20 providing spacing and supporting a load of second rigid link assembly 12, thus reducing material and cost requirements of fluid supply assembly 20.

Referring to further aspects of articulated arm 100, a spacing distance between proximal axis a and rotary axis A can be defined by one or more rigid link member of unitary construction. A rigid link member such as a rigid link member of unitary construction can define a spacing distance between proximal axis a and rotary axis A by extending a distance between proximal axis a and rotary axis A. A rigid link member such as a rigid link member of unitary construction can also define a spacing distance between proximal axis a and rotary axis A by being one of a succession of rigidly joined rigid link members of unitary construction which by their being joined combine to extend the distance between proximal axis a and rotary axis A. Where a rigid link member such as a rigid link member of first rigid link assembly 11 as set forth herein defines a spacing distance between proximal axis and rotary axis, the one or more rigid link member can support a load of the second rigid link assembly 12 connected to first rigid link assembly 11. A rigid link member of unitary construction that defines a spacing distance between proximal angle a and rotary axis A and extends between proximal axis a rotational axis A can rotate about proximal axis a and can support rotation of second rigid link assembly 12 about rotary axis A. A succession of rigid link members that define a spacing distance between proximal axis a and rotary axis A and combine to extend a distance between proximal axis a and rotary axis A can rotate about proximal axis a and can support rotation of rigid link assembly 12 about rotary axis A. Rigid link members of unitary construction that define a spacing distance between proximal axis a and rotary axis A can be formed of cast iron in one example.

In one embodiment, one or more component of fluid supply assembly 20 can define a spacing distance between proximal axis a and rotary axis A. Referring to the embodiment of FIGS. 1 and 2, rigid link members of unitary construction provided by rigid link member 1011 rigid structural member 32 and by motor housing 21H define a spacing distance between proximal axis a and rotary axis A. The rigid link members 1011, 32, and 21H, of unitary construction shown in FIG. 1 and FIG. 2 can each support the load of rigid link assembly 12 connected to rigid link assembly 11 and can be joined by e.g. welding using welds, fastening using fasteners, e.g., bolts, or using threads. Provisioning a rigid link assembly such as first rigid link assembly 11 so that a rigid link member of unitary construction that defines a spacing distance between proximal axis a and rotary axis A is provided by a component of fluid supply assembly 20 can reduce a size, weight and cost of the rigid link assembly. In the development of apparatus herein it was observed that performance of articulated arm 100 can be improved by decreasing a size and weight of articulated arm 100. Reduced size and weight of a rigid link assembly can result in higher speed and lower cost of a rigid link assembly. In one aspect, for reduction of a size and weight of first rigid link assembly 11, first rigid link assembly 11 can be configured so that one or more rigid link member that defines a spacing distance between proximal axis a and rotary axis A is provided by a component of fluid supply assembly 20.

Referring to the embodiments of FIG. 3 and FIG. 4 first rigid link assembly 11 can include a plurality of rigid link members that are rigidly joined together to define a spacing distance between proximal axis a and rotary axis A. In the embodiments of FIG. 3 and FIG. 4, a spacing distance between proximal axis a and rotary axis A is defined by rigid link member 1011 of unitary construction in combination with the rigid link member of unitary construction that is provided by rigid structural member 32 in combination with the rigid link member of unitary construction that is provided by motor housing 21H that houses motor 21M in combination with the rigid link member of unitary construction provided by cylinder 54. The rigid link members 1011, 32, 21H, 54 of unitary construction shown in FIG. 3 and FIG. 4 can each support the load of rigid link assembly 12 connected to rigid link assembly 11 and can be joined by e.g. welding using welds, fastening using fasteners, e.g., bolts, or using threads. For example, rigid structural member 32 of unitary construction can be welded to outer cylinder 54 and can be threadably joined to the rigid link member provided by motor housing 21H. Motor housing 21H in turn can be threadably joined to motor housing member 1011 or unitary construction.

In one embodiment one or more component of fluid supply assembly 20 can be supported in a fixed position in relation to a rigid link member of unitary construction that defines a spacing distance between proximal axis a and rotary axis A and the supported one or more component of the fluid supply assembly 20 may provide little or no supporting of the load of second rigid link assembly 12. As such, the supported one or more component fluid supply assembly 20 can be easily removed and replaced for servicing or upgrading, with articulated arm 100 remaining standing and intact.

Referring to FIGS. 5-11, rigid link assembly 11 can include one or a plurality of rigid link members 111 and 112 of unitary construction that define a spacing distance between proximal axis a and rotary axis A and which extend a distance between proximal axis a and rotary axis A. It was observed that advantages can be provided by supporting components of fluid supply assembly by one or more of such rigid link members 111 and 112. The ease of servicing and maintenance advantage noted herein can be provided. In addition, a supported one or more component of fluid supply assembly 20 can be shielded, and thereby housed and protected by such one or more rigid link members 111 and 112.

Figure 5:
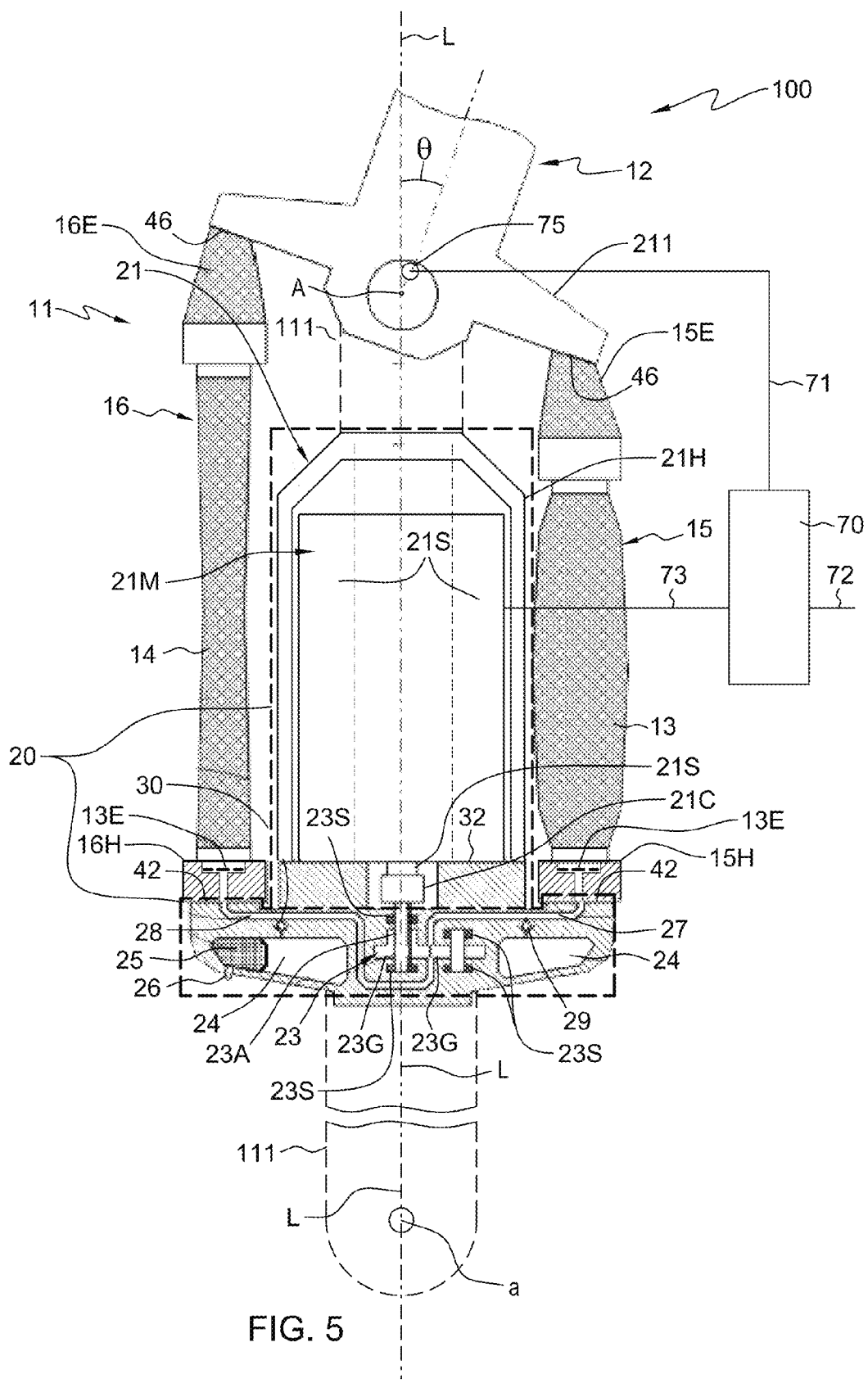
FIG. 5 is a combination side and cross sectional view of an articulated robot arm in one embodiment.
Figure 6:
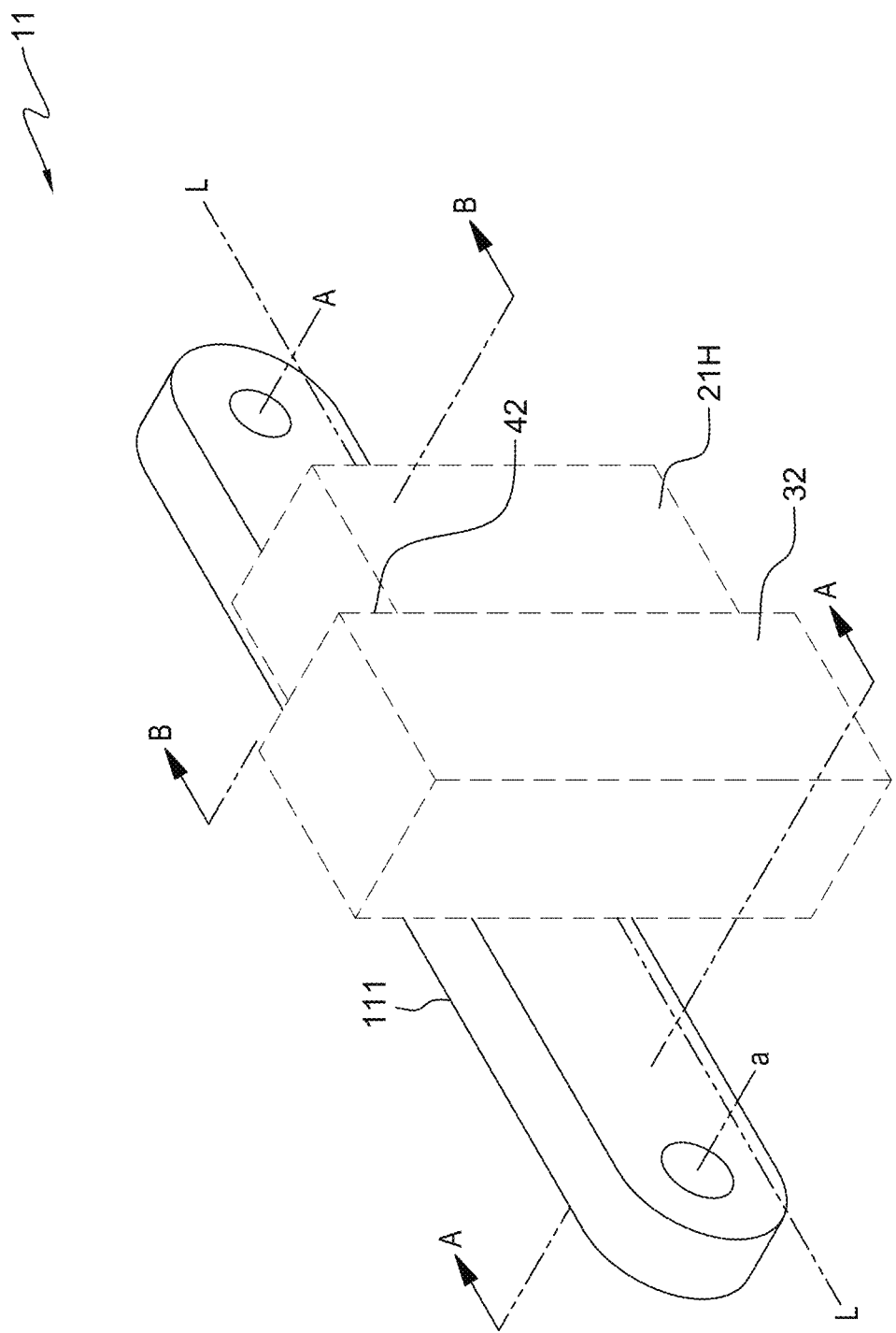
FIG. 6 is a schematic perspective view of a rigid link assembly having functionality of the rigid link assembly set forth in reference to the articulated robot arm set forth in FIG. 5.

Referring now to the particular embodiment of FIGS. 5 and 6, the embodiments of FIG. 5 and FIG. 6 include a fluid supply assembly 20 configured as described in the embodiment of FIG. 1 but include rigid link member 111 of unitary construction extending a distance between proximal axis a and rotary axis A. Rigid link member 111 as shown in the embodiments of FIG. 5 and FIG. 6 can be a rigid link member of unitary construction that defines a spacing distance of first rigid link assembly 11 and extends a distance from proximal axis a to rotary axis A.

In the embodiments as shown in FIGS. 5 and 6, one or more component of fluid supply assembly 20 can be rigidly supported by one or more rigid link member that defines a spacing distance between proximal axis a and rotary axis A. In the embodiments of FIG. 5 and FIG. 6, rigid link member 111 of unitary construction can define a spacing distance between proximal axis a and rotary axis A and can extend the distance from proximal axis a to rotary axis A. In one aspect, rigid structural member 32 that defines reservoir 24 fluid supply line 27 and fluid supply line 28 and which supports stationary components of check valves 29 and 30 and pump stator 23S can be supported in a fixed position by member 111 as shown in the embodiments of FIG. 5 and FIG. 6. Motor housing 21H which can support in a fixed position relative thereto stationary components of motor 21M such as motor stator 21S can be supported by rigid link member 111 in a fixed position in relation to rigid link member 111. Because member 111 as shown in the embodiments of FIG. 5 and FIG. 6 can rotate about proximal axis a and can support rotation of rigid link assembly 12 about rotary axis A, the components 32, 24, 27, 28, 29, 30, 23S, 21H and 21S of fluid supply assembly 20 as described in connection with the embodiments of FIGS. 5 and 6 can be supported in a fixed position by rigid link member 111 in relation to proximal axis a and rotary axis A.

Figure 7:
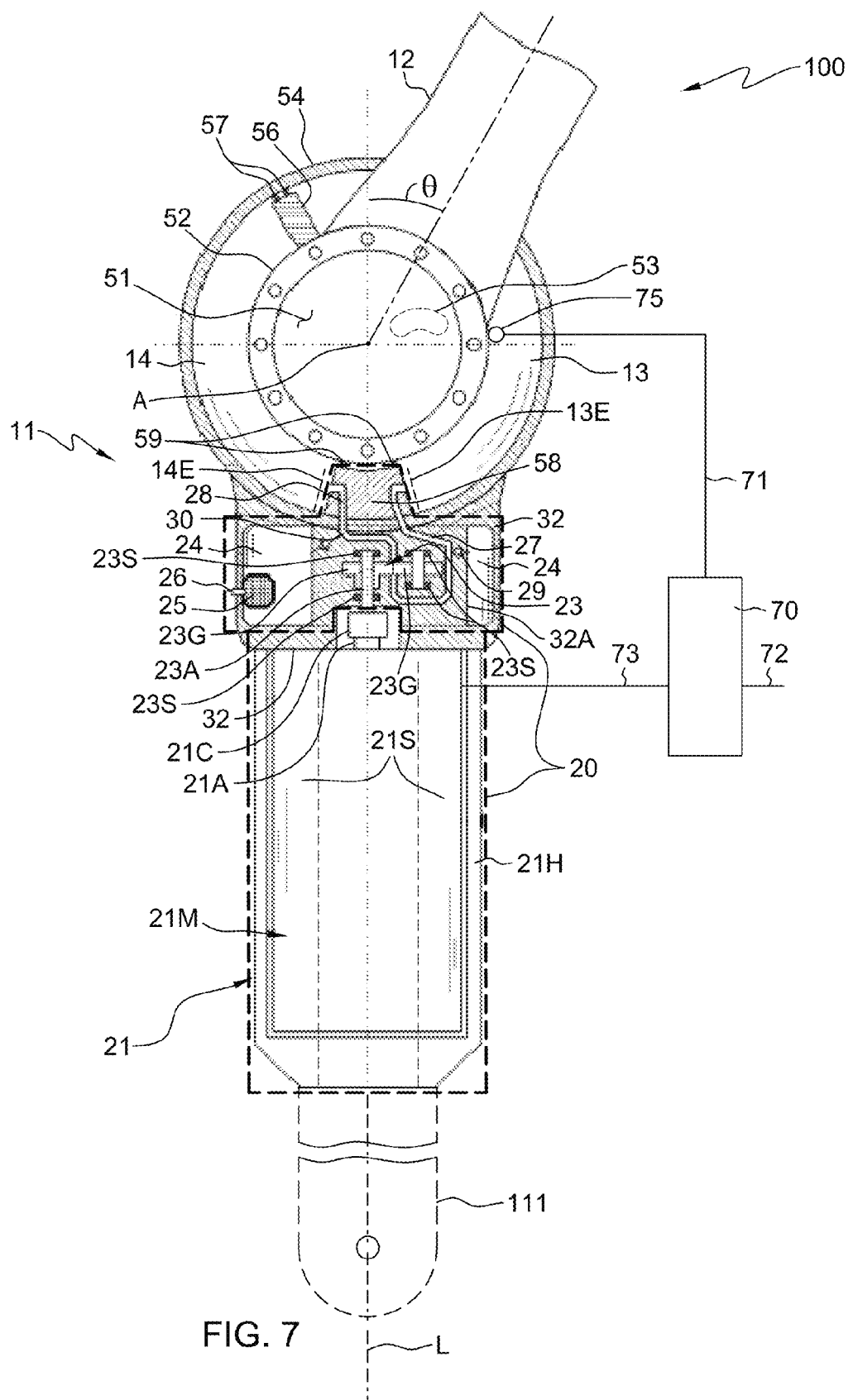
FIG. 7 is a combination side and cross sectional view of an articulated robot arm in one embodiment.
Figure 8:
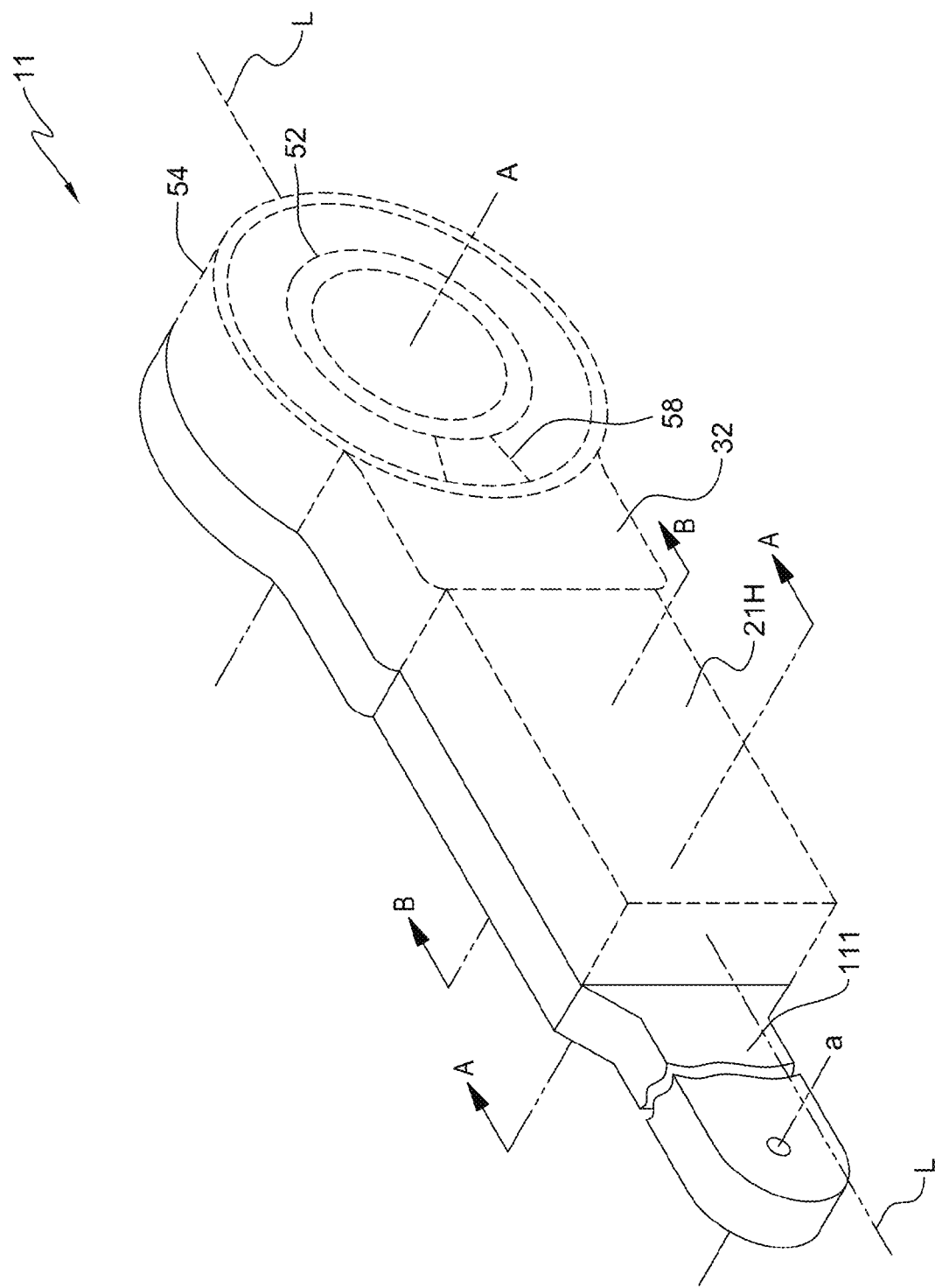
FIG. 8 is a schematic perspective view of a rigid link assembly having functionality of the rigid link assembly set forth in reference to the articulated robot arm set forth in FIG. 7.

Referring now to the particular embodiments of FIG. 7 and FIG. 8, the embodiments of FIG. 7 and FIG. 8 include a fluid supply assembly 20 configured as described in of FIG. 3 but include rigid link member 111 extending a distance between proximal axis a and rotary axis A. Rigid link member 111 as shown in the embodiments of FIG. 7 and FIG. 8 is a rigid link member of unitary construction that defines a spacing distance of first rigid link assembly 11 and extends a distance from proximal axis a to rotary axis A (end extending to rotary axis A hidden from view in FIG. 7).

In the embodiments of FIG. 7 and FIG. 8 first rigid link assembly 11 can include rigid link member 111 of unitary construction that defines a spacing distance between proximal axis a and rotary axis A and extends a distance between proximal axis a and rotary axis A. Rigid link member 111 can support in a fixed position in relation to rigid link member 111 one or more component of fluid supply assembly 20. Rigid structural member 32 of unitary construction defining or supporting in a fixed position reservoir 24, fluid supply lines 27 and 28, stationary components of check valves 29 and 30 and stationary components of pump 23 such as pump stator 23S can be supported by rigid link member 111 in a fixed position relative to rigid link member 111. Motor housing 21H which can support in a fixed position relative thereto stationary components of motor 21M such as motor stator 21S can be supported by rigid link member 111 in a fixed position in relation to rigid link member 111. Because member 111 in the embodiments of FIG. 7 and FIG. 8 can rotate about proximal axis a and can support rotation of rigid link assembly 12 about rotary axis A, the components 32, 32A 24, 27, 28, 29, 30, 23S, 21H and 21S of fluid supply assembly 20 as described in connection with the embodiments of FIGS. 7 and 8 can be supported in a fixed position by rigid link member 111 in relation to proximal axis a and rotary axis A.

As illustrated by the embodiments of FIGS. 5-8 rigid link assembly 11 can include a rigid link member 111 of unitary construction that defines a spacing distance between proximal axis a and rotary axis A and which extends a distance between proximal axis a and rotary axis A. Rigid link member 111 of unitary construction as set forth herein with reference to FIGS. 5-8 can support the load of second rigid link assembly 12 connected to first rigid link assembly 11. As is set forth with reference to FIGS. 9-11, the embodiments of FIGS. 5-8 can be adapted to include a second a rigid link member 112 of unitary construction that defines a spacing distance between proximal axis a and rotary axis A and which extends a distance between proximal axis a and rotary axis A. Rigid link member 112 as set forth herein with reference to FIGS. 9-11 can together with rigid link member 111 support in fixed position in relation thereto one or more component of fluid supply assembly 20 and the load of second rigid link assembly 12 connected to first rigid link assembly 11.

Figure 9:
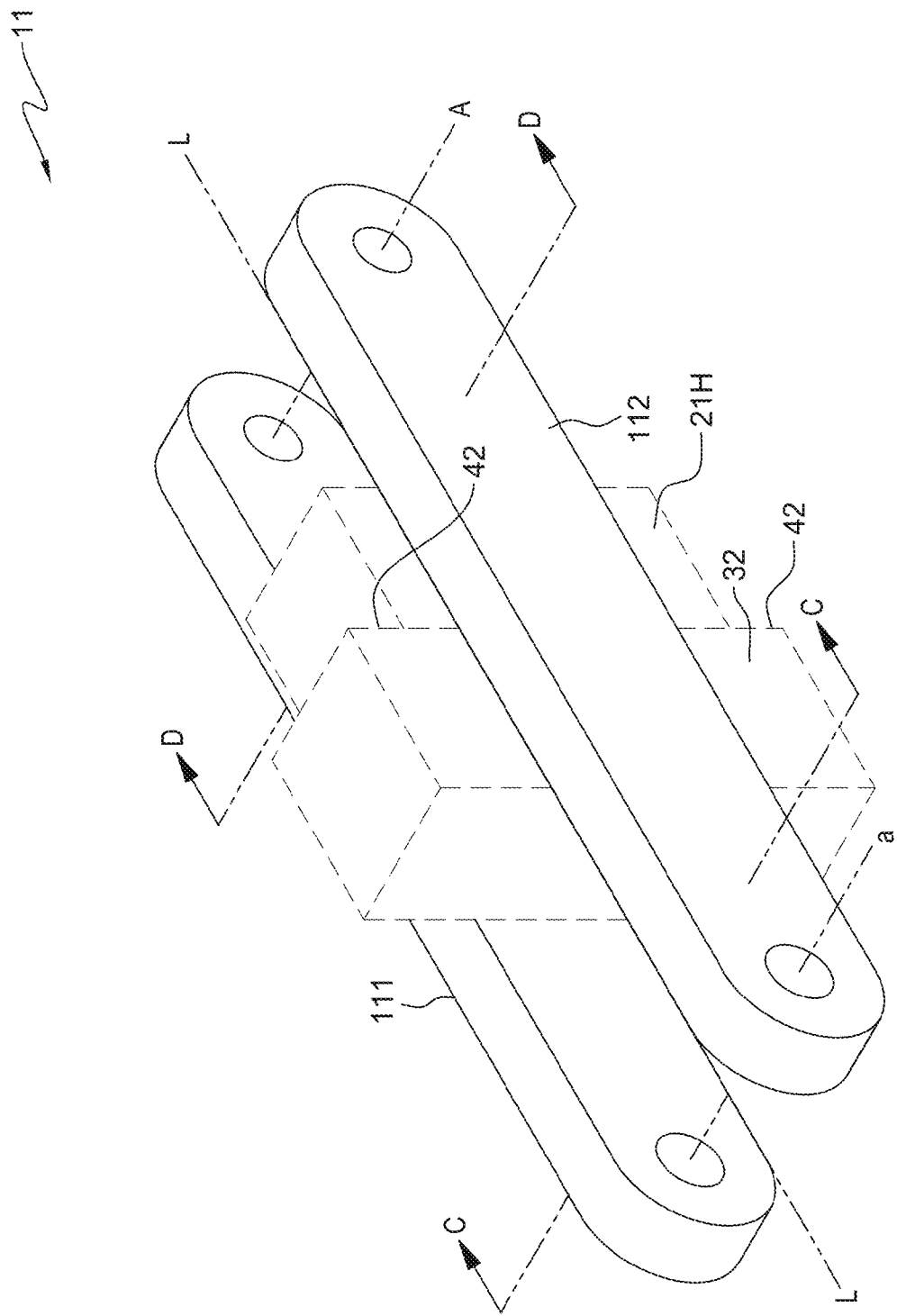
FIGS. 9-12 are perspective views of various rigid link assemblies.

As shown in FIG. 9, first rigid link assembly 11 can include first rigid link member 111 of unitary construction defining a spacing distance between proximal axis a and rotary axis A and extending a distance between proximal axis a and rotary axis A as well as a second rigid link member 112 of unitary construction defining a spacing distance between proximal axis a and rotary axis A and extending a distance between proximal axis a and rotary axis A. In the embodiment of FIG. 9, rigid link member 111 of unitary construction and rigid link member 112 of unitary construction are spaced apart throughout their lengths. As shown by the dashed in phantom components depicted in FIG. 9, one or more of rigid link member 111 and rigid link member 112 can support in a fixed position in relation thereto one or more component of fluid supply assembly 20. FIG. 9 schematically depicts components of the fluid supply assembly 20 as set forth in FIG. 5 supported by rigid link member 111 and rigid link member 112 in fixed position in relation to rigid link member 111 and rigid link member 112. One or more of rigid structural member 32 and motor housing 21H configured as set forth herein in reference to FIG. 5 can be supported by rigid link member 111 and rigid link member 112 in a fixed position in relation to rigid link member 111 and rigid link member 112.

Figure 10:
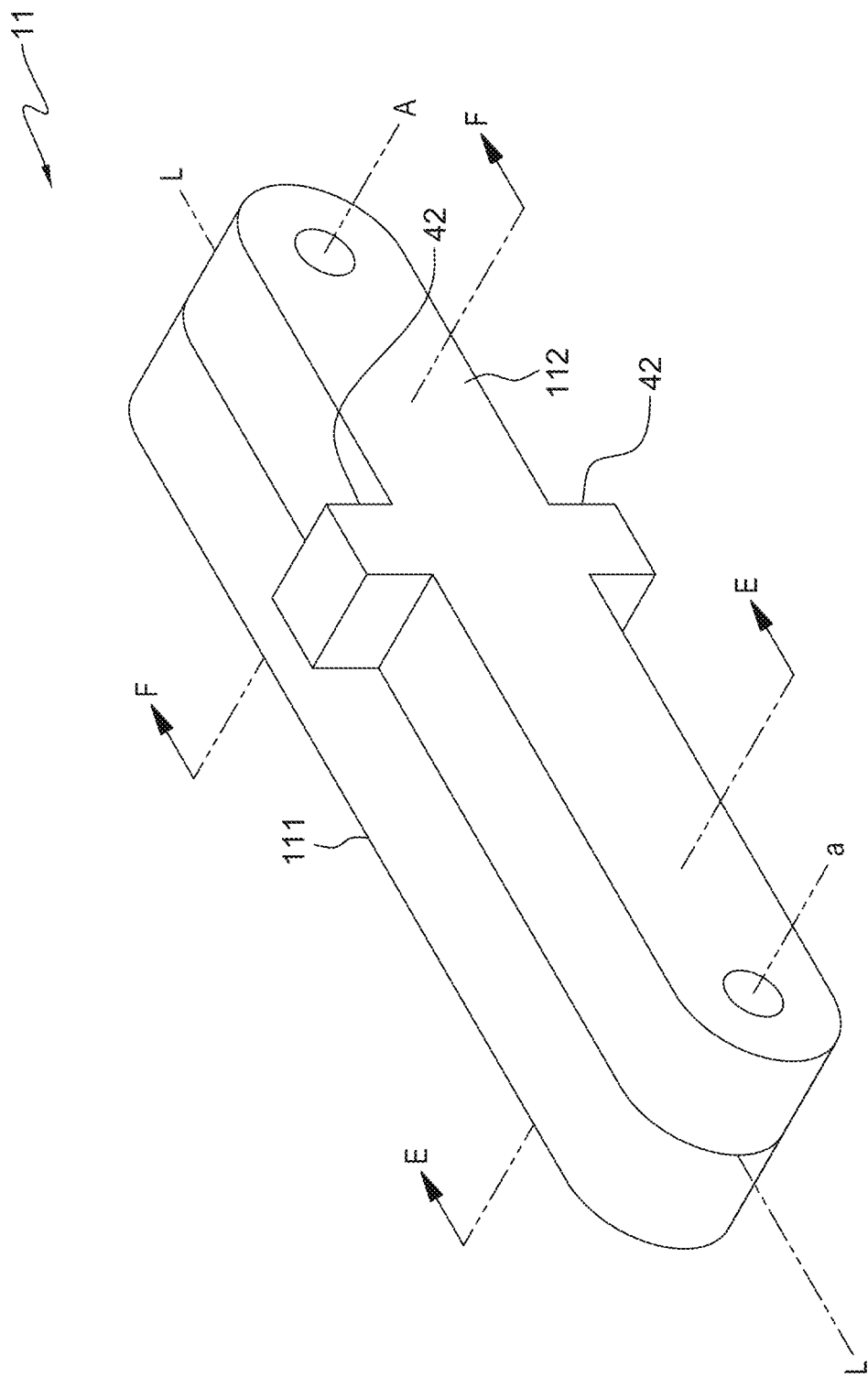

In the embodiment as shown in FIG. 10, first rigid link assembly 11 can include first rigid link member 111 of unitary construction defining a spacing distance between proximal axis a and rotary axis A and a second rigid link member 112 of unitary construction defining a spacing distance between proximal axis a and rotary axis A. In the embodiment of FIG. 10, rigid link member 111 of unitary construction and rigid link member 112 of unitary construction are in contact with one another throughout their lengths. As illustrated in FIG. 10, rigid link member 112 that defines a spacing distance between proximal axis a and rotary axis A and which extends the distance between proximal axis a and rotary axis A can be appropriately shaped to include flange surfaces 42 for supporting muscle 15 and muscle 16 as set forth in the embodiments of FIG. 1 and FIG. 5.

Figure 11:
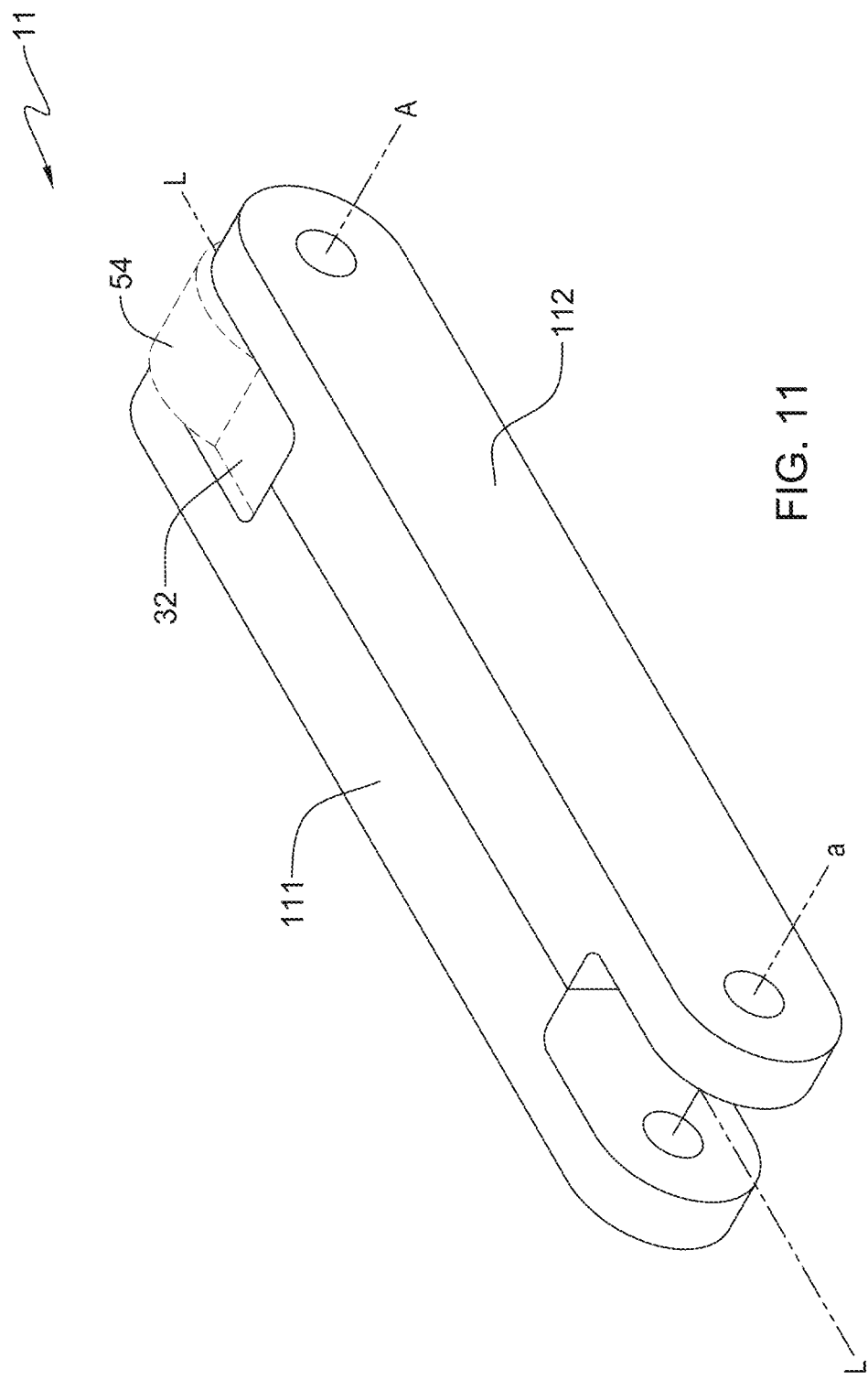

In the embodiment as shown in FIG. 11, first rigid link assembly 11 can include a first rigid link member 111 of unitary construction defining a spacing distance between proximal axis a and rotary axis A and a second rigid link member 112 of unitary construction defining a spacing distance between proximal axis a and rotary axis A. In the embodiment of FIG. 11, rigid link member 111 of unitary construction and rigid link member 112 of unitary construction are in contact with one another throughout a portion of their respective lengths. In the embodiment of FIG. 11, the fluid supply assembly 20 as described in connection with FIG. 7 having rigid structural member 32 and outer cylinder 54 is schematically depicted as being supported by a rigid link member 111 and rigid link member 112.

Figure 12:
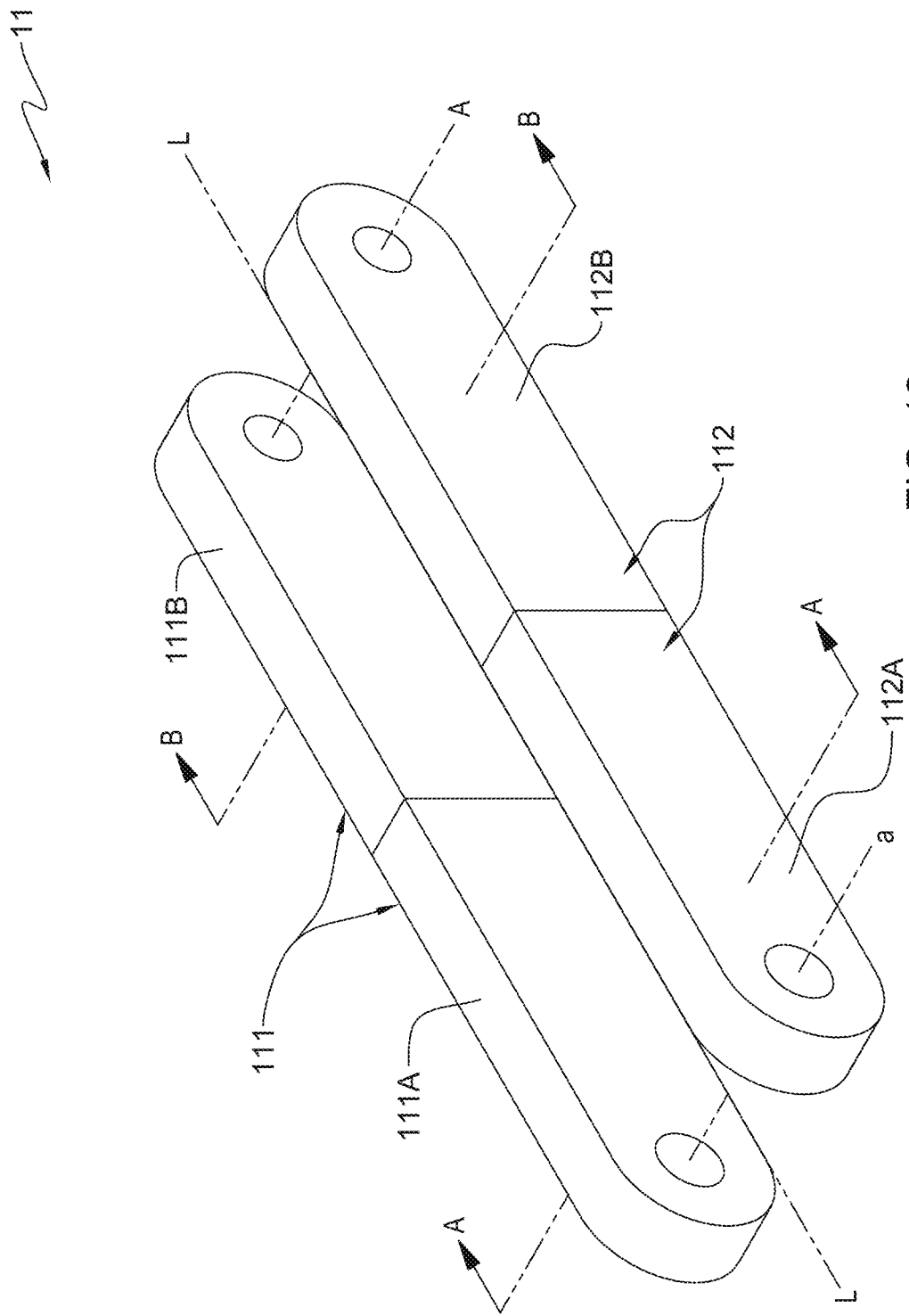

In the embodiments of FIGS. 5-11 rigid link member 111 of unitary construction defines a spacing distance between proximal axis a and rotary axis A and extends a distance from proximal axis a to rotary axis A. In the embodiments of FIGS. 9-11, rigid link members 111 and 112 of unitary construction defines a spacing distance between proximal axis a and rotary axis A and extends a distance from proximal axis a to rotary axis A. In another embodiment, elongated rigid link member 111 and/or elongated rigid link member 112 can define a spacing distance between proximal axis a and rotary axis A but can be non-unitary in construction and can include a combination of rigid link members that are rigidly joined together to define a spacing distance between proximal axis a and rotary axis A. Referring to the embodiment of FIG. 12, rigid link member 111 defining a spacing distance between proximal axis a and rotary axis A can include rigid link member 111A of unitary construction rigidly joined to rigid link member 111B of unitary construction. Rigid link member 112 as shown in FIG. 12 defining a spacing distance between proximal axis a and rotary axis A can be of non-unitary construction and can include two joined rigid link members of unitary construction. In the embodiment of FIG. 12, rigid link member 112B of unitary construction can be rigidly joined to rigid link member 112B of unitary construction to define rigid link member 112. Rigid link members herein can be rigidly joined together using e.g. welds, fasteners (e.g. bolts) and/or threads. The rigid link members 111 and 112 as set forth in reference to FIG. 12 can replace the rigid link members 111 and 112 of unitary construction set forth in reference to any of the embodiments of FIGS. 5-11.

Figure 13:
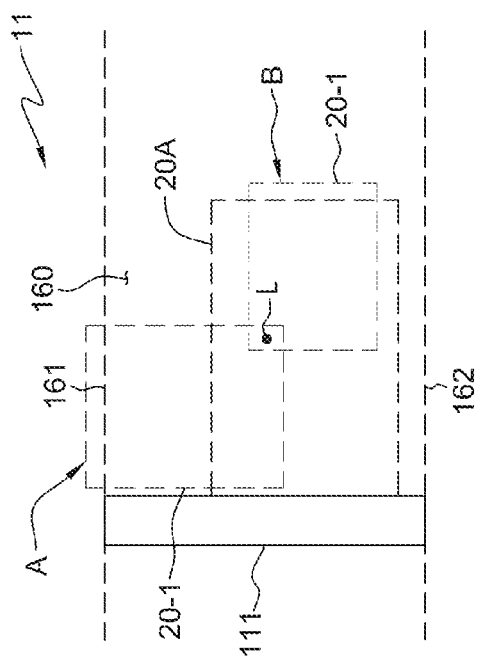
FIG. 13 is a cross-sectional view taken along line A-A and B-B FIGS. 6 and 8.

In one aspect, first rigid link assembly 11 can define a housing. For example, in the embodiments illustrated in FIGS. 5-12 one or more of first and second rigid link members 111, 112 can define a housing having a housing interior which is labeled element housing interior 160 in the cross sectional bottom views of the FIGS. 13-15. A cross sectional view taken along line A-A and line B-B of the embodiments of FIG. 6 and FIG. 8 where first rigid link assembly 11 can be provided by a single rigid link member 111 defining a spacing distance between proximal axis a and rotary axis A is shown in FIG. 13. In the embodiment of FIG. 13 an interior 160 of a housing can be defined adjacent to rigid link member 111. Rigid link member 111 can shield and thereby house one or more component of fluid supply assembly 20. In the embodiment of FIG. 13 a left side of housing interior 160 can be delimited by rigid link member 111 and tops and bottoms of housing interior 160 can be delimited by imaginary planes 161 and 162 extending from the top and bottom of rigid link member 111 perpendicularly with respect to an interior surface of rigid link member 111 as depicted in FIG. 13.

Figure 15:
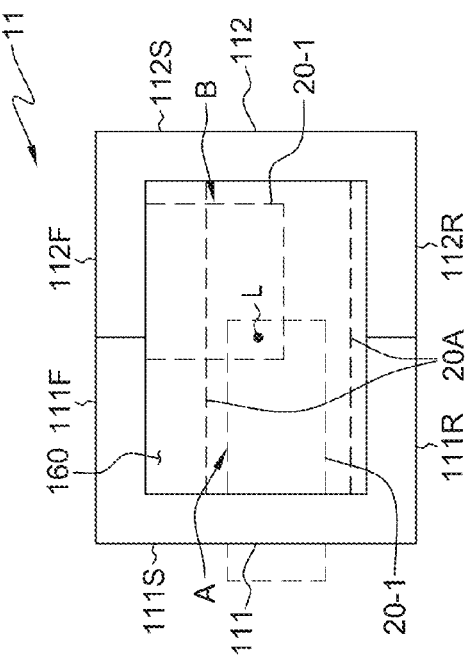
FIG. 15 is a cross-sectional view taken along line E-E and F-F of FIG. 10.
Figure 14:
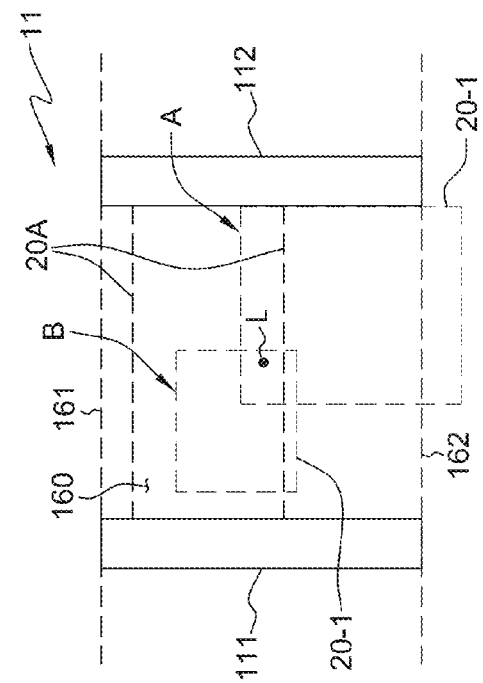
FIG. 14 is a cross-sectional view taken along line C-C and D-D of FIG. 9.

In the embodiment illustrated in FIG. 14, showing a cross sectional view taken along line C-C, and D-D of FIG. 9 of a housing interior 160 can be delimited by rigid link members 111 and 112 and fronts and backs of housing interior 160 can be delimited by imaginary planes 161 and 162. Imaginary plane 161 can extend along front surfaces of rigid link members 111, 112. Imaginary plane 162 can extend along back surfaces of rigid link members 111, 112. In the embodiment illustrated in FIG. 15 showing a cross sectional view taken along lines E-E, and F-F of FIG. 10, sides of housing interior 160 can be delimited by sidewalls 111S, 112S of rigid link members 111, 112, a back of housing interior 160 can be defined by back walls 111R, 112R of rigid link members 111, 112 and a front of housing interior 160 can be defined by front walls 111F, 112F of rigid link members 111, 112. In one example, rigid link members 111 and 112 as depicted in the embodiments of FIGS. 13-15 can define a housing having an interior 160 in which each component of fluid supply assembly 20 is entirely disposed.

A housing defined by one or more rigid link member defining a spacing distance between proximal axis a and rotary axis A can house and thereby provide structural protection to components therein such as components of fluid supply assembly 20. In one embodiment, a component of fluid supply assembly 20 of an articulated arm 100 can be disposed in an interior 160 of a housing defined by one or more rigid link member defining a spacing distance between proximal axis a and rotary axis A. By being disposed in an interior 160 of a housing defined by one or more rigid link member defining a spacing distance between proximal axis a and rotary axis A, a component can be entirely disposed in an interior 160 of a housing defined by one or more rigid link member defining a spacing distance between proximal axis a and rotary axis A. By being disposed in an interior 160 of a housing defined by first rigid link assembly 11, a component can be partially disposed in an interior 160 of a housing defined by one or more rigid link member defining a spacing distance between proximal axis a and rotary axis A.

In one embodiment, one or more of pump 23, reservoir 24, fluid supply lines 27, 28 check valves 29, 30 or motor assembly 21 can be disposed in a housing interior 160 defined by one or more rigid link member defining a spacing distance between proximal axis a and rotary axis A. In the schematic view of FIGS. 13-15 the reference numerals 20-1 represent a single one component of fluid supply assembly 20, e.g., one of components 21, 23, 24, 27, 28, 29, 30. In one embodiment, each of a pump 23, reservoir 24, fluid supply lines 27, 28, or check valves 29, 30 and motor assembly 21 are disposed in a housing interior 160 defined by one or more rigid link member defining a spacing distance between proximal axis A and rotary axis A. Phantom elements 20-1, 20A depicted in FIGS. 13-15 schematically illustrate a single component 20-1 or each component 20A of fluid supply assembly 20 at any depth (in the foreground or background of cross section shown). In the schematic diagram of FIGS. 13, 14 and 15 reference element 20-1 represents a single component of fluid supply assembly and reference element 20A represents each component of fluid supply assembly 20. As depicted schematically by the phantom component 20-1 at location A of FIGS. 13, 14 and 15, a component of fluid supply assembly 20 in one embodiment can be partially disposed in an interior 160 of a defined housing. As indicated by component 20-1 at location B of FIGS. 13, 14 and 15, a component of fluid supply assembly 20 can be entirely disposed in an interior 160 of a defined housing. As depicted schematically by the phantom fluid supply assembly 20A shown in FIGS. 13, 14, and 15, each component of fluid supply assembly 20 in one embodiment can be entirely disposed in an interior 160 of a defined housing.

In one aspect, first rigid link assembly 11 can include a longitudinal axis L. Where first rigid link assembly 11 includes a single rigid link member 111 defining a spacing distance between proximal axis a and rotary axis A, longitudinal axis L can extend adjacent to and parallel to rigid link member 111 as shown in FIG. 16. As shown in FIG. 16, longitudinal axis L of first rigid link assembly 11, where a spacing distance between proximal axis a and rotary axis A is defined by a single rigid link member 111, can extend through second rigid link assembly 12 rotatably connected to first rigid link assembly 11 and/or through proximal rigid link assembly 9 rotatably connected to first rigid link assembly 11.

In a further aspect, a longitudinal axis L of first rigid link assembly 11 can extend through cross sectional centers of members of unitary construction that define first rigid link assembly 11. A cross sectional view showing longitudinal axis L of first rigid link assembly 11 taken along line C-C and along line D-D of first rigid link assembly 11 depicted in FIG. 9 is shown in FIG. 14. A cross sectional view of first rigid link assembly 11 taken along line E-E and along line F-F of the first rigid link assembly 11 depicted in FIG. 10 is shown in FIG. 15. In the embodiments of FIGS. 5-12 where rigid link members 111, 112 of first rigid link assembly 11 are linear, longitudinal axis L can be a single direction longitudinal axis. In the embodiments of FIGS. 1-4 one or more rigid link member of unitary construction defining a spacing distance between proximal axis A and rotary axis A is provided by a component of fluid supply assembly 20. In the embodiment of FIGS. 1-4, longitudinal axis L can extend through cross sectional centers of components of fluid supply assembly 20 defining a spacing distance between proximal axis A and rotary axis A. Longitudinal axis L can be a curved longitudinal axis where rigid link members 111, 112 are curved. Longitudinal axis L can have a succession of line segments wherein rigid link members defining a spacing distance between proximal axis a and rotary axis A have multiple linear segments.

In one aspect, articulated arm 100 can be configured so that longitudinal axis L extends through one or more component of fluid supply assembly 20. In one aspect, articulated arm 100 can be configured so that longitudinal axis L extends through one or more of a component of pump 23 or motor assembly 21. Providing articulated arm 100 so that longitudinal axis L extends through one or more of a component of pump 23 or motor assembly 21 can facilitate a compact configuration for articulated arm 100, enhancing a capacity of articulated arm 100 to be maneuvered into confined spaces. Referring to the embodiments of FIGS. 1-8 longitudinal axis L can extend through motor assembly 21, motor 21M, pump 23 and rigid structural member 32 which can define reservoir 24 and fluid supply lines 27 and 28.

A rigid link assembly as set forth herein can be regarded as including one or more rigid link member of unitary construction that defines a spacing distance between axes, e.g. proximal axis a and rotary axis A. A rigid link assembly can also be regarded as including any additional members of unitary construction that are supported in a fixed position in relation to one or more rigid link member of unitary construction that define a spacing distance between axes, e.g., proximal axis a and rotary axis A.

A component of fluid supply assembly 20 as set forth herein can be provided by a subcomponent of a larger component, e.g., a motor 21M of motor assembly 21, a motor stator 21S of motor 21M, a section of material defining the component.

Members that are described herein as being rigidly joined together can be supported in a fixed position in relation to one another, and can be rigidly joined by welding, with use of fasteners, e.g., bolts or by threads. Members that are described herein as being rigidly joined together can be formed of cast iron in one embodiment.

Structural aspects of fluid supply assembly 20 that facilitate a compact and low cost configuration for rigid link assembly 11 have been described, including structural aspects wherein one or more component of fluid supply assembly 20 can be supported in a fixed position in relation to a fluid supply end 13E, 14E of a fluid chamber 13, 14, wherein one or more component of a fluid supply assembly 20 can be supported in a fixed position in relation to proximal axis a and rotary axis A, wherein a rigid link member defining a spacing distance between proximal axis a and rotary axis A can be provided by a component of a fluid supply assembly 20, wherein a rigid link member defining a spacing distance between proximal axis a and rotary axis A houses and protects one or more component of fluid supply assembly 20, and wherein a rigid link assembly 11 is configured so that a longitudinal axis L of the rigid link assembly 11 extends through one or more component of a rigid link assembly 11.

Operational aspects of fluid supply assembly 20 can also facilitate a reduced cost, size and weight (and therefore improved speed) configuration for first rigid link assembly 11 and articulated arm 100.

In one aspect, it was observed that where a number of motion generating devices (e.g. motors, solenoids which convert electrical energy into mechanical energy) of fluid supply assembly 20 increases, costs of fluid supply assembly 20 can increase, including costs of maintenance of fluid supply assembly 20. Size and possibly weight requirements of fluid supply assembly 20 can increase as well, for the reason that additional equipment servicing access structures and mounting arrangements may need to be designed into fluid supply assembly 20.

In one aspect, fluid supply assembly 20 can be based on simplified operation, and can include a reduced number of motion generating devices. Referring to the operation of fluid supply assembly 20 as set forth herein in reference to FIGS. 1-16 (including in reference to the detailed schematic views of FIGS. 1, 3, 5, and 7) operation of fluid supply assembly 20 in one embodiment can be based on operation of the single motion generating device, motor 21M, which drives a single motion imparting device, pump 23, to operate pump 23.

Operating motor 21M to drive pump 23 in a first direction can cause motion of rigid link assembly 12 in relation to rigid link assembly 11 about rotary axis A in a first joint angle direction. By driving pump 23 in a first direction, pump 23 can pump fluid from second fluid chamber 14 and/or from reservoir 24 into first fluid chamber 13, and can draw fluid from second fluid chamber 14 into reservoir 24. Operating motor 21M to drive pump 23 in a second direction opposite the first direction can cause motion of rigid link assembly 12 in relation to rigid link assembly 11 about rotary axis A in a second joint angle direction opposite the first joint angle direction. By driving pump 23 in a second direction opposite the first direction, pump 23 can pump fluid from first fluid chamber 13 and/or reservoir 24 into second fluid chamber 14 and can draw fluid from first fluid chamber 13 into reservoir 24.

In one aspect, one or more fluid supply path of fluid supply assembly 20 can be absent any motorized, solenoid or otherwise active valve. More specifically, fluid supply line 27 defining a fluid flow path (both in a pressure state and a suction state) extending between pump 23 and first fluid chamber 13 can be absent any valve and accordingly can be absent any active valve. Fluid supply line 28 defining a fluid flow path (both in a pressure state and a suction state) extending between pump 23 and second fluid chamber 14 can be absent any valve and accordingly can be absent any active valve. Check valves 29 and 30 can be passive and can be absent any active device. A pressure state fluid supply path extending between reservoir 24 and first fluid chamber 13 can be defined by check valve 30, fluid supply line 28, pump 23, and fluid supply line 27 and can be absent any active valve. A suction state fluid supply path extending between first fluid chamber 13 and reservoir 24 can be defined by fluid supply line 27 and check valve 29 and can be absent any active valve. A pressure state fluid supply path extending between reservoir 24 and second fluid chamber 14 can be defined by check valve 29, fluid supply line 27, pump 23, and fluid supply line 28 and can be absent any active valve. A suction state fluid supply path extending between second fluid chamber 14 and reservoir 24 can be defined by fluid supply line 28 and check valve 30 and can be absent any active valve. In one embodiment, fluid supply assembly 20 can be absent any active valve and each fluid supply path of fluid supply assembly 20 can be absent an active valve.

Operating as described in connection with FIGS. 1-16 including with reference to the schematic diagrams of FIGS. 1, 3, 5, and 7, fluid supply assembly 20 can be configured to move fluid into and out of first fluid chamber 13 and second fluid chamber 14 by operation of pump 23 driven by motor 21M without activation of an active valve.

Providing one or more fluid flow path extending between pump 23 and first fluid chamber 13 or first fluid chamber 14 or between reservoir 24 and fluid chamber 13 or chamber 14 to be absent an active valve can reduce cost and space requirements of fluid supply assembly 20. With configurations set forth herein, fluid supply paths of fluid supply assembly 20 need not include costly control and power lines to active valves and costly failures resulting from malfunctioning or improper control of an active valve can be avoided. In addition, fluid flow paths of fluid supply assembly 20 can be configured to be absent valve access structures and mounting arrangement to allow access to an active valve. Check valves need not be provided with control and power line communication and there can be minimal risk of failure of a check valve which would require access of a check valve for servicing or replacement. Accordingly, a compact reduced size and lower weight configuration of fluid supply assembly 20 can be further facilitated wherein valves of fluid supply assembly 20, namely check valves 29 and 30 in one embodiment, are supported within an internal location of fluid supply assembly 20, as illustrated in the schematic views of FIGS. 1, 3, 5, and 7.

In another aspect, articulated arm 100 can be configured for simplified control. Providing fluid supply assembly 20 to include a reduced number of motion generating devices that convert electrical energy into mechanical energy can facilitate simplified control of fluid supply assembly 20 to further facilitate a reduced cost, size, and weight (and thereby improved speed) configuration for first rigid link assembly 11 and articulated arm 100.

In one aspect, movement of second rigid link assembly 12 about rotation axis A can be controlled simply by operating motor 21M to drive and operate pump 23 in a first direction and in a second direction opposite the first direction. In one embodiment, a current value the angle, θ, of second rigid link assembly 12 about first rigid link assembly 11 can be changed in a first joint angle direction (increasing or decreasing) by operating motor 21M to drive and operate pump 23 in a first direction and the current value of the angle, θ, of second rigid link assembly 12 about first rigid link assembly 11 can be caused to change in a second joint angle direction opposite the first joint angle direction by operating motor 21M to drive pump 23 in a second direction opposite the first direction.

Articulated arm 100 as set forth in the embodiments of FIGS. 1-16 can include a control circuit 70 (shown in the schematic views of FIGS. 1, 3, 5, and 7) that transmits motor control signals to motor 21M through signal line 73. A set of motor control signals that can be transmitted to motor 21M from control circuit 70 by signal line 73 can be a low overhead simplified set of motor control signals. In one embodiment, the set of motor control signals that can be transmitted to motor 21M from control circuit 70 by signal line 73 can be restricted to motor control signals that control a rotational direction of motor 21M for driving of pump 23 in one of a first direction or second direction. In one embodiment, the set of motor control signals that can be transmitted to motor 21M from control circuit 70 by signal line 73 can be restricted to motor control signals that control a rotational direction and speed of motor 21M.

Cost and size reduction of rigid link assembly 11 can be further facilitated with use of closed loop control of the motion of rigid link assembly 12 in relation to rigid link assembly 11 about rotary axis A. Configuring rigid link assembly 11 to provide closed loop control of the motion of rigid link assembly 12 in relation to rigid link assembly 11 about rotary axis A can reduce machine tolerance requirements of structural members of fluid supply assembly 20, as well as other parameter requirements, including timing requirements and volume control requirements and temperature control requirements. In one embodiment, control circuit 70 can provide closed loop control for causing rotation of second rigid link assembly 12 in relation to first rigid link assembly 11 about rotary axis A. Control circuit 70, based on a signal indicating a current value of the angle, θ, between rigid link assembly 12 and rigid link assembly 11, can provide closed loop control for causing rotation of second rigid link assembly 12 in relation to first rigid link assembly about rotary axis A. In one embodiment, control circuit 70 can be a closed loop control circuit that outputs a control signal to motor 21M of the fluid supply assembly 20 based on a signal indicating the current value of angle of the second rigid link assembly 12 in relation to the first rigid link assembly 11 and based on a signal indicating a selected value of the angle of the second rigid link assembly 12 in relation to the first rigid link assembly 11.

Control circuit 70 can receive a feedback signal via signal line 71 and a command signal via signal line 72. The command signal can be input in response to one or more of a process or user input control. Control circuit 70 can output a control signal via signal line 73 to motor 21M. Signal lines 71, 72, 73 can be wired or wireless signal lines. Articulated arm 100 can include a sensor 75 for sensing a current value of the angle, θ, between first rigid link assembly 11 and second rigid link assembly 12.

A signal indicating the current value of the angle, θ, between first rigid link assembly 11 and second rigid link assembly 12 can be transmitted via signal line 71 to control circuit 70 which can process the signal indicating the current value of the angle, θ, between rigid link assembly 11 and rigid link assembly 12 and a selected value signal received from signal line 72, to output an appropriate motor control signal to motor 21M transmitted by signal line 73 so that a current value of the angle between the second rigid link assembly 12 and the first rigid link assembly 11 is in closer correspondence with the selected value that is indicated by the selected value signal. The selected value signal can indicate a selected value for the angle, θ, between the rigid link assembly 12 and first rigid link assembly 11 about rotary axis A and can be input into control circuit 70 in response to one or more of a process or user input control.

Control circuit 70 can be configured for closed loop control of a parameter in place of or in addition to the parameter of a current value of the angle, θ, of rigid link assembly 12 in relation to rigid link assembly 11. For example, control circuit 70 can be configured to provide closed loop control of one or more of torque or speed of second rigid link assembly 12 in relation to first rigid link assembly 11 about rotary axis A. Sensor 75 can include one or more of a torque or speed sensor for sensing one or more of torque or speed of second rigid link assembly 12 in relation to first rigid link assembly 11 about rotary axis A. Control circuit 70 can receive a sensor signal indicative of one or more of a current value of torque or speed of second rigid link assembly 12 about first rigid link assembly 11 about rotary axis A via signal line 71 and via signal line 73 can input motor control signals to motor 21M to control one or more of torque or speed of rigid link assembly 12 in relation to rigid link assembly 11 about rotary axis A based on the current value of one or more of torque or speed indicated by sensor 75 and a user or process selected value for one or more of torque or speed of rigid link assembly 12 in relation to rigid link assembly 11 about rotary axis A as received by control circuit 70 via signal line 72.

In another aspect, articulated arm 100 can be configured so that motor 21M can be overdriven for periods of limited duration. Motor 21M can have a maximum continuous operating power output rating and can be driven to produce a power output above the maximum continuous operating power rating of motor 21M for periods of limited duration. It was observed that motor 21M according to the configuration of motor 21M in fluid supply assembly 20 as set forth in FIGS. 1, 3, 5 and 7 can be operated produce a power output above a maximum continuous operating power output rating of motor 21M for periods of limited duration where motor 21M is allowed to cool during OFF state periods of motor 21M between periods of operation of motor 21M. Fluid supply assembly 20 can be configured so that first rigid link assembly 11 can support a load of second rigid link assembly when motor 21M is in an OFF state. In one aspect, articulated arm 100 can be configured so that control circuit 70 transmits to motor 21M via signal line 73 motor control signals to cause movement of first rigid link assembly 11 in relation to second rigid link assembly 12 about rotary axis A. Articulated arm 100 can be configured so that in response to motor control signals received from control circuit 70, motor 21M can produce a power output above a maximum continuous operating power output rating of motor 21M for a period of limited duration determined by control circuit 70. In another aspect, articulated arm 100 can be configured so that responsively to initiation of an OFF state of motor 21M after a period of limited duration in which motor 21M is overdriven, control circuit 70 controls motor 21M to remain in an OFF state for a period of time that can be determined by control circuit 70. Configuring articulated arm 100 so that control circuit 70 can overdrive motor 21M to produce a power output above a maximum continuous power output rating of motor 21M can facilitate use of a smaller horsepower motor and accordingly can further reduce a cost, size and weight (and therefore can increase a speed) of articulated arm 100.

Referring to the configurations described with reference to FIGS. 1-16 (including with reference to the schematic views of fluid supply assembly 20 in FIGS. 1, 3, 5, and 7), fluid supply assembly 20 in one embodiment can include a motion generating device, namely motor 21M. Motor 21M in one embodiment can be the single motion generating device of fluid supply assembly 20 that generates mechanical energy in response to applied electrical energy. Motor 21M can be mechanically coupled to pump 23 so that pump 23 rotates when motor 21M rotates. Configuring fluid supply assembly 20 so that fluid supply assembly 20 includes a single motion generating device, e.g., motor 21M can reduce a cost of fluid supply assembly 20 including a cost of maintaining fluid supply assembly 20. In a related aspect, fluid supply assembly 20 in one embodiment can include a single motion imparting device, e.g., pump 23, which can be driven by motor 21M. Configuring fluid supply assembly 20 so that fluid supply assembly 20 includes a single motion imparting device, e.g., pump 23 can reduce a cost of fluid supply assembly 20 including a cost of maintaining fluid supply assembly 20.

In one aspect, fluid motion of fluid supply assembly 20 can be controlled with motion imparting forces that are imparted from within a first area of fluid supply assembly 20. In one aspect, fluid motion of fluid supply assembly 20 can be controlled with motion imparting forces that are imparted entirely from within a first area of fluid supply assembly 20. The first area can be a localized area spaced apart from the first fluid chamber 13 and the second fluid chamber 14. The motion imparting forces can be imparted by a single pump which can be provided by pump 23 within the first area in one embodiment. In one embodiment, the single pump can be capable of moving in a first direction and in a second direction opposite the first direction.

In the embodiments set forth herein, proximal axis a and rotary axis A are shown as horizontal axis supporting vertical rotation of rigid link assemblies 11 and 12. One or more of proximal axis a or rotary axis A could alternatively be in another dimension e.g. vertical axes for supporting horizontal rotation of a link assembly, e.g., first rigid link assembly 11 and/or second rigid link assembly 12.

Figure 17:
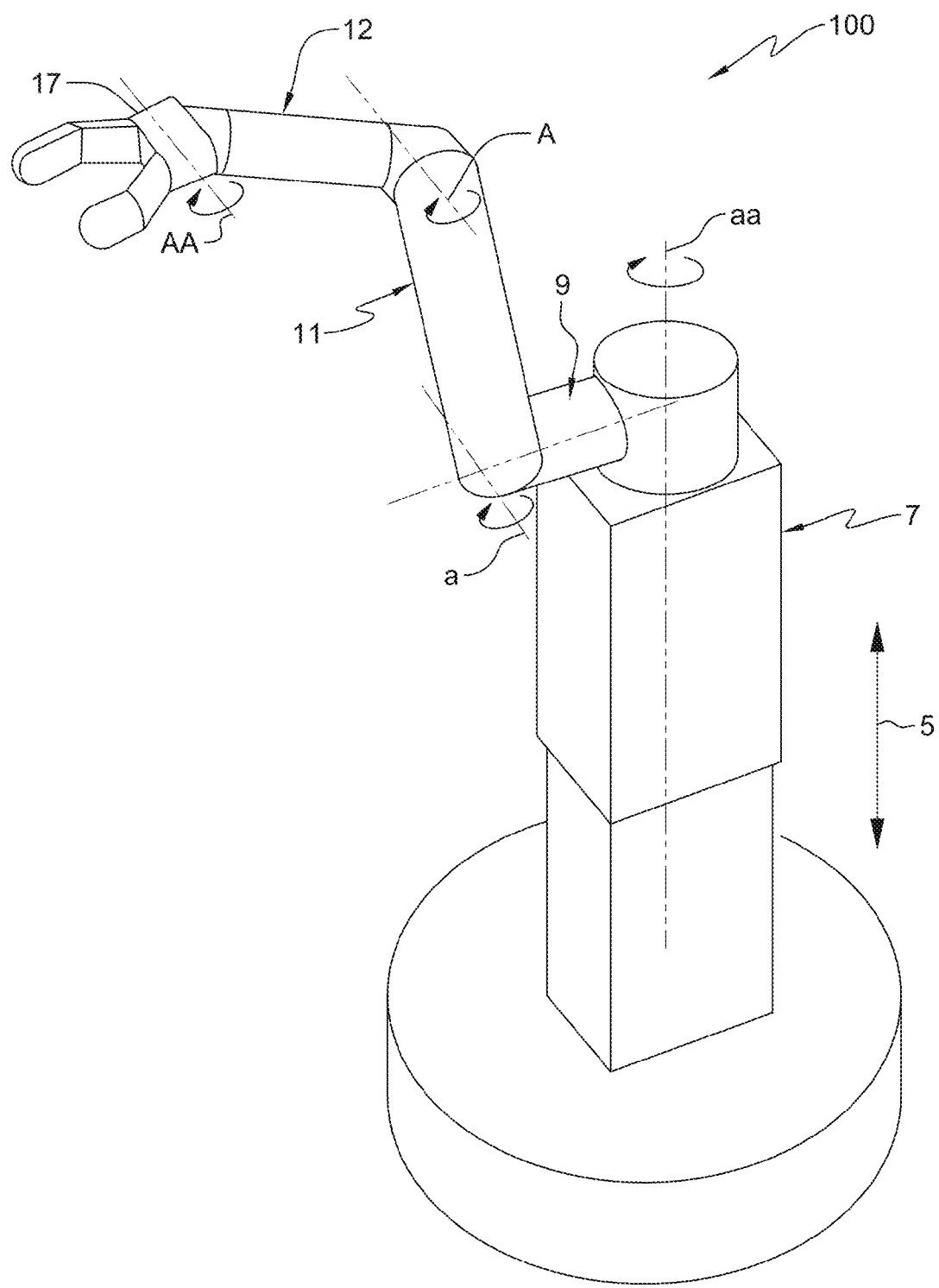
FIG. 17 is a perspective expanded view of an articulated arm for a robot in one embodiment.

An expanded view of an articulated arm 100 where articulated arm 100 is an articulated robot arm in one exemplary implementation is shown in FIG. 17. Articulated arm 100 can include a support (base) 7 which can be configured to remain in a fixed position and can be installed in a fixed position. Support 7 can include a linear actuator capable of adjusting a height of support 7 as is represented by arrow 5. Proximal rigid link assembly 9 can extend between axis aa and proximal axis a. First rigid link assembly 11 can extend between proximal axis a and rotary axis A. Second rigid link assembly 12 can extend between rotary axis A and axis AA. Effector part 17 can be rotatably connected to second rigid link assembly 12 so that effector part 17 can rotate in relation to second rigid link assembly 12 about axis AA. Articulated arm 100 can include less than or greater than the degrees of freedom as shown in the implementation view of FIG. 17. Effector part 17 can be e.g., a gripper or an alternative tool. In the embodiment of FIG. 17 proximal axis a is shown as being closer to support 7 than effector part 17 and first rigid link assembly 11 can extend from axis a toward effector part 17. In another embodiment, proximal axis a can be located closer to effector part 17 and rigid link assembly 11 can extend from axis a toward support 7.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Likewise, the term "defined by" encompasses arrangements wherein a second element is fully defined by or partially defined by the first element. Similarly, the term "disposed in" encompasses arrangements herein a second element is entirely disposed in or partially disposed in a first element. Similarly, the term "based on" can encompass both "partially based on" causal relationships and "entirely based on" causal relationships. Furthermore, a device or structure that is configured in a certain way is configured in at least that way, but may also be configured in ways that are not listed. While embodiments are set forth herein having a certain number of elements such embodiments can be practiced with less than or greater than the certain number of elements. Relationships set forth herein wherein a first element is described as supporting a second element can encompass relationships wherein the first element fully supports the second element and can encompass relationships wherein the first element partially supports the second element. Relationships set forth herein wherein a first element is described as described as defining a second element can encompass relationships wherein the first element fully defines the second element and can encompass relationships wherein the first element partially defines the second element.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. An articulated arm for a robot, the articulated arm comprising:
   a plurality of rigid link members including a first rigid link assembly and a second rigid link assembly, wherein the first rigid link assembly rotates about a proximal axis;
   an actuator for moving the second rigid link assembly in relation to the first rigid link assembly about a rotary axis, the actuator including a first fluid chamber, and a second fluid chamber, the actuator having a fluid supply assembly for moving fluid into and out of each of the first fluid chamber and the second fluid chamber;
   wherein the articulated arm is configured so that one or more component of the fluid supply assembly is supported in a fixed position in relation to a fluid supply end of the first fluid chamber, the one or more component including a component selected from the group consisting of a reservoir, component of a pump, and a component of a motor.

2. The articulated arm of claim 1, wherein the one or more component includes a reservoir.

3. The articulated arm of claim 1, wherein each of a reservoir, a component of the pump, and a component of the motor are supported in a fixed position in relation to each of the proximal axis and the rotary axis.

4. The articulated arm of claim 1, wherein the first rigid link assembly includes a succession of rigid link members of unitary construction that combine to extend a distance between the proximal axis and the rotary axis, wherein the succession of rigid link members of unitary construction includes a first rigid link member of unitary construction and a second rigid link member of unitary construction, the first rigid link member of unitary construction supporting a load of the second rigid link assembly and being provided by rigid structural member defining a reservoir of the fluid supply assembly, the first rigid link member of unitary construction supporting a load of the second rigid link assembly and being provided by a motor housing that houses the motor.

5. The articulated arm of claim 1, wherein the first rigid link assembly includes a first rigid link member of unitary construction that defines a spacing distance between the proximal axis and the rotary axis and extends a distance between the proximal axis and the rotary axis, wherein one or more component of the fluid supply assembly is supported in a fixed position in relation to the first rigid link member.

6. The articulated arm of claim 1, wherein a longitudinal axis of the first rigid link assembly extends through one or more component of the fluid supply assembly, wherein the one or more component includes a component selected from the group consisting of a pump and a motor.

7. The articulated arm of claim 1, wherein the plurality of rigid link members includes a rigid link member that extends a distance between the proximal axis and the rotary axis, and wherein the fluid supply assembly includes one or more component disposed in an interior of a housing defined by the rigid link member.

8. The articulated arm of claim 1, wherein the fluid supply assembly includes a reservoir, a pump, and a motor, and wherein the first rigid link assembly includes a first rigid link member and a second rigid link member, each defining a spacing distance between the proximal axis and the rotary axis, each extending a distance between the proximal axis and the rotary axis, and each supporting a load of the second rigid link assembly, wherein the first rigid link member and the second rigid link member define a housing interior, and wherein each of the reservoir, the pump and the motor are located within the housing interior.

9. The articulated arm of claim 1, wherein the fluid supply assembly includes a pump and a fluid supply line extending between the pump and the first fluid chamber, the fluid supply line defined by a rigid structural member, the fluid supply line being absent a flexible section, and the rigid structural member being supported in a fixed position in relation to the fluid supply end of the first fluid chamber.

10. The articulated arm of claim 1, wherein the actuator includes a member that defines an open volume intersected by the rotary axis.

11. An articulated arm for a robot, the articulated arm comprising:
   a plurality of rigid link members including a first rigid link assembly and a second rigid link assembly, wherein the first rigid link assembly rotates about a proximal axis;
   an actuator for moving the second rigid link assembly in relation to the first rigid link assembly about a rotary axis, the actuator including a first fluid chamber, and a second fluid chamber, the actuator having a fluid supply assembly for moving fluid into and out of each of the first fluid chamber and the second fluid chamber;
   wherein the articulated arm is configured so that one or more component of the fluid supply assembly is supported in a fixed position in relation to a fluid supply end of the first fluid chamber, the one or more component including a component selected from the group consisting of a reservoir, component of a pump, and a component of a motor,
   wherein one or more rigid link member of unitary construction defines a spacing distance between the proximal axis and the rotary axis, and wherein the one or more rigid link member of unitary construction that defines a spacing distance between the proximal axis and the rotary axis includes a component of the fluid supply assembly.

12. The articulated arm of claim 11, wherein the one or more rigid link member of unitary construction that defines the spacing distance between the proximal axis and a rotary axis includes a rigid structural member that defines one or more of a fluid supply line or a reservoir of the fluid supply assembly.

13. The articulated arm of claim 11, wherein the rigid structural member that defines one or more of the fluid supply line or the reservoir of the fluid supply assembly supports a load of the second rigid link assembly.

14. An articulated arm for a robot, the articulated arm comprising:
   a plurality of rigid link members including a first rigid link assembly and a second rigid link assembly, wherein the first rigid link assembly rotates about a proximal axis;
   an actuator for moving the second rigid link assembly in relation to the first rigid link assembly about a rotary axis, the actuator including a first fluid chamber, and a second fluid chamber, the actuator having a fluid supply assembly for moving fluid into and out of each of the first fluid chamber and the second fluid chamber;
   wherein the articulated arm is configured so that one or more component of the fluid supply assembly is supported in a fixed position in relation to a fluid supply end of the first fluid chamber, the one or more component including a component selected from the group consisting of a reservoir, component of a pump, and a component of a motor,
   wherein the fluid supply assembly includes a motor and a passive check valve for use in controlling a flow of fluid from a reservoir to the first fluid chamber, wherein the articulated arm includes a closed loop control circuit that outputs a control signal to the motor based on a signal input to the control circuit indicating the current value of a parameter of the second rigid link assembly in relation to the first rigid link assembly and based on a signal input to the control circuit indicating a selected value of the parameter of the second rigid link assembly in relation to the first rigid link assembly.

15. The articulated arm of claim 14, wherein the fluid supply assembly is configured to move fluid into and out of the first fluid chamber by operation of a pump without activation of an active valve, and wherein the first fluid chamber is a fluid chamber selected from the group consisting of a fluid chamber defined by a flexible bladder and fluid chamber having an annular volume.

* * * * *